US009649928B2

(12) United States Patent
Danielson et al.

(10) Patent No.: US 9,649,928 B2
(45) Date of Patent: May 16, 2017

(54) ALL-TERRAIN VEHICLE

(71) Applicant: Polaris Industries Inc., Medina, MN (US)

(72) Inventors: Ronnie R. Danielson, Roseau, MN (US); Amanda S. Peterson, Forest Lake, MN (US); Kendall C. Majer, Roseau, MN (US); Burton D. Fischer, Badger, MN (US); Ryan L. Haugen, Roseau, MN (US); Todd M. Blumer, Badger, MN (US); William B. Rodriguez, Roseau, MN (US); Steven D. Wilcox, Maple Grove, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/751,114

(22) Filed: Jun. 25, 2015

(65) Prior Publication Data
US 2016/0375757 A1  Dec. 29, 2016

(51) Int. Cl.
B60K 11/00 (2006.01)
B60K 11/04 (2006.01)
(Continued)

(52) U.S. Cl.
CPC ............ B60K 11/04 (2013.01); B60K 5/02 (2013.01); B60K 11/06 (2013.01);
(Continued)

(58) Field of Classification Search
CPC ............ B60G 17/0185; B60G 17/0195; B60G 2600/08; B60G 2800/90; B60R 16/0315
See application file for complete search history.

(56) References Cited

U.S. PATENT DOCUMENTS 1,031,497 A   7/1912   West
2,468,809 A   5/1949   Brock
(Continued)

FOREIGN PATENT DOCUMENTS

GB   2347398     9/2000
JP   20067269    4/1985
(Continued)

OTHER PUBLICATIONS

Redline Specs, copyright 2008, available at www.RedlinePerforms.com., 2 pages.
(Continued)

Primary Examiner — John Walters
Assistant Examiner — James Triggs
(74) Attorney, Agent, or Firm — Faegre Baker Daniels LLP

(57) ABSTRACT

An all-terrain vehicle ("ATV") includes a plurality of ground engaging members and a frame supported above a ground surface by the plurality of ground engaging members. The frame extends along a longitudinal centerline of the ATV. The ATV further includes an operator seat supported by the frame, an engine supported by the frame, and a continuously variable transmission ("CVT") supported by the frame and operably coupled to the engine. Additionally, the ATV includes a CVT cooling air inlet fluidly coupled to the CVT and positioned forward of a forward end of the operator seat, and a CVT cooling air outlet fluidly coupled to the CVT and positioned forward of the forward end of the operator seat.

38 Claims, 40 Drawing Sheets

(51) Int. Cl.
*B60K 5/02* (2006.01)
*B60K 11/06* (2006.01)
*B60K 5/00* (2006.01)

(52) U.S. Cl.
CPC ..... *B60K 2005/003* (2013.01); *B60Y 2200/20* (2013.01); *B60Y 2300/19* (2013.01)

(56) References Cited

U.S. PATENT DOCUMENTS

| | | |
|---|---|---|
| 2,576,017 A | 11/1951 | John |
| 2,833,366 A | 5/1958 | Olley |
| 3,193,302 A | 7/1965 | Hill |
| 3,292,944 A | 12/1966 | Danguthier |
| 3,366,411 A | 1/1968 | Vittone |
| 3,603,422 A | 9/1971 | Cordiano |
| 3,712,416 A | 1/1973 | Swanson et al. |
| 3,791,482 A | 2/1974 | Sykora |
| 3,800,910 A | 4/1974 | Rose |
| D237,873 S | 12/1975 | Johnson |
| 3,966,014 A | 6/1976 | Gowing |
| 4,109,751 A | 8/1978 | Kabele |
| 4,114,713 A | 9/1978 | Mery |
| 4,136,756 A | 1/1979 | Kawamura |
| 4,217,970 A | 8/1980 | Chika |
| 4,254,746 A | 3/1981 | Chiba et al. |
| 4,340,123 A | 7/1982 | Fujikawa |
| 4,425,976 A | 1/1984 | Kimura |
| 4,592,316 A | 6/1986 | Shiratsuchi et al. |
| 4,600,072 A | 7/1986 | Krude |
| 4,641,854 A | 2/1987 | Masuda et al. |
| 4,681,178 A | 7/1987 | Brown |
| 4,705,128 A | 11/1987 | Krude |
| 4,773,675 A | 9/1988 | Kosuge |
| 4,817,985 A | 4/1989 | Enokimoto et al. |
| 4,974,697 A | 12/1990 | Krude |
| 5,016,728 A | 5/1991 | Zulawski |
| 5,036,939 A | 8/1991 | Johnson |
| 5,048,860 A | 9/1991 | Kanai et al. |
| 5,203,585 A | 4/1993 | Pierce |
| 5,251,713 A | 10/1993 | Enokimoto |
| 5,251,718 A | 10/1993 | Inagawa et al. |
| 5,327,989 A | 7/1994 | Furuhashi et al. |
| 5,507,510 A | 4/1996 | Kami et al. |
| 5,562,066 A | 10/1996 | Russell et al. |
| 5,697,633 A | 12/1997 | Lee |
| 5,819,702 A | 10/1998 | Mendler |
| 5,961,135 A | 10/1999 | Smock |
| 6,056,077 A | 5/2000 | Kobayashi |
| 6,070,689 A | 6/2000 | Tanaka et al. |
| 6,142,123 A | 11/2000 | Galasso et al. |
| 6,152,253 A | 11/2000 | Monoghan |
| D436,557 S | 1/2001 | Selby et al. |
| 6,216,809 B1 | 4/2001 | Etou et al. |
| 6,224,046 B1 | 5/2001 | Miyamoto |
| 6,247,442 B1 | 6/2001 | Bedard et al. |
| 6,412,585 B1 | 7/2002 | DeAnda |
| 6,523,627 B2 | 2/2003 | Fukuda |
| 6,523,634 B1 | 2/2003 | Gagnon et al. |
| RE38,012 E | 3/2003 | Ochab |
| 6,581,716 B1 | 6/2003 | Matsuura |
| 6,588,536 B1 | 7/2003 | Chiu |
| 6,622,806 B1 | 9/2003 | Matsuura |
| 6,626,256 B2 | 9/2003 | Dennison et al. |
| 6,626,260 B2 | 9/2003 | Gagnon et al. |
| 6,655,717 B1 | 12/2003 | Wang |
| 6,722,463 B1 | 4/2004 | Reese |
| 6,732,830 B2 | 5/2004 | Gagnon et al. |
| 6,745,862 B2 | 6/2004 | Morii et al. |
| D494,890 S | 8/2004 | Katoh |
| D497,324 S | 10/2004 | Chestnut |
| 6,799,781 B2 | 10/2004 | Rasidescu et al. |
| 6,820,708 B2 | 11/2004 | Nakamura |
| 6,868,932 B1 | 3/2005 | Davis et al. |
| D503,658 S | 4/2005 | Lu |
| D511,317 S | 11/2005 | Tanaka et al. |
| 7,004,137 B2 | 2/2006 | Kunugi et al. |
| 7,040,437 B1 | 5/2006 | Fredrickson et al. |
| 7,055,454 B1 | 6/2006 | Whiting |
| 7,143,861 B2 | 12/2006 | Chu |
| D535,215 S | 1/2007 | Turner |
| 7,159,557 B2 | 1/2007 | Yasuda et al. |
| 7,168,516 B2 | 1/2007 | Nozaki et al. |
| 7,172,232 B2 | 2/2007 | Chiku et al. |
| D549,133 S | 8/2007 | LePage |
| 7,258,355 B2 | 8/2007 | Amano |
| 7,275,512 B2 | 10/2007 | Deiss et al. |
| D555,036 S | 11/2007 | Eck |
| D563,274 S | 3/2008 | Ramos |
| 7,357,207 B2 | 4/2008 | Vaisanen |
| 7,357,211 B2 | 4/2008 | Inui |
| 7,380,805 B1 | 6/2008 | Turner |
| 7,401,797 B2 | 7/2008 | Cho |
| D578,433 S | 10/2008 | Kawaguchi et al. |
| D578,934 S | 10/2008 | Tanaka et al. |
| D595,613 S | 7/2009 | Lai et al. |
| 7,588,010 B2 | 9/2009 | Mochizuki et al. |
| 7,591,472 B2 | 9/2009 | Kinjyo et al. |
| 7,600,769 B2 | 10/2009 | Bessho et al. |
| D604,201 S | 11/2009 | Kawaguchi et al. |
| D605,555 S | 12/2009 | Tanaka et al. |
| D606,900 S | 12/2009 | Flores |
| 7,694,769 B2 | 4/2010 | McGuire |
| 7,708,106 B1 | 5/2010 | Bergman et al. |
| 7,728,212 B2 | 6/2010 | Fujishima et al. |
| D622,631 S | 8/2010 | Lai |
| D625,662 S | 10/2010 | Li |
| 7,819,220 B2 | 10/2010 | Sunsdahl |
| 7,891,684 B1 | 2/2011 | Luttinen et al. |
| D650,311 S | 12/2011 | Bracy |
| 8,100,434 B2 | 1/2012 | Miura |
| 8,167,325 B2 | 5/2012 | Lee et al. |
| 8,517,136 B2 | 8/2013 | Hurd et al. |
| 8,613,335 B2 | 12/2013 | Deckard et al. |
| 8,613,336 B2 | 12/2013 | Deckard et al. |
| 8,746,719 B2 | 6/2014 | Safranski et al. |
| 8,827,019 B2 | 9/2014 | Deckard et al. |
| 8,827,020 B2 | 9/2014 | Deckard et al. |
| 2002/0023792 A1 | 2/2002 | Bouffard et al. |
| 2003/0137121 A1 | 7/2003 | Lenz et al. |
| 2004/0195034 A1 | 10/2004 | Kato et al. |
| 2004/0195797 A1 | 10/2004 | Nash et al. |
| 2004/0206567 A1 | 10/2004 | Kato et al. |
| 2004/0206568 A1 | 10/2004 | Davis et al. |
| 2005/0006168 A1 | 1/2005 | Iwasaka et al. |
| 2005/0056472 A1 | 3/2005 | Smith et al. |
| 2005/0173177 A1 | 8/2005 | Smith et al. |
| 2005/0173180 A1 | 8/2005 | Hypes et al. |
| 2005/0206111 A1 | 9/2005 | Gibson et al. |
| 2006/0000458 A1 | 1/2006 | Dees et al. |
| 2006/0032690 A1 | 2/2006 | Inomoto et al. |
| 2006/0032700 A1 | 2/2006 | Vizanko |
| 2006/0071441 A1 | 4/2006 | Mathis |
| 2006/0219463 A1 | 10/2006 | Seki et al. |
| 2006/0236980 A1 | 10/2006 | Maruo et al. |
| 2007/0000715 A1 | 1/2007 | Denney |
| 2007/0023221 A1 | 2/2007 | Okuyama |
| 2007/0023566 A1 | 2/2007 | Howard |
| 2007/0119650 A1 | 5/2007 | Eide |
| 2007/0221430 A1 | 9/2007 | Allison |
| 2007/0227793 A1 | 10/2007 | Nozaki et al. |
| 2007/0256882 A1 | 11/2007 | Bedard et al. |
| 2008/0023240 A1 | 1/2008 | Sunsdahl |
| 2008/0023249 A1 | 1/2008 | Sunsdahl |
| 2008/0257630 A1 | 10/2008 | Takeshima et al. |
| 2008/0283326 A1 | 11/2008 | Bennett et al. |
| 2008/0284124 A1 | 11/2008 | Brady |
| 2008/0308334 A1 | 12/2008 | Leonard et al. |
| 2009/0001748 A1 | 1/2009 | Brown et al. |
| 2009/0090575 A1 | 4/2009 | Nagasaka |
| 2009/0178871 A1 | 7/2009 | Sunsdahl et al. |
| 2009/0205891 A1 | 8/2009 | Parrett et al. |
| 2009/0302590 A1 | 12/2009 | Bronkhorst et al. |
| 2010/0078256 A1 | 4/2010 | Kuwabara et al. |
| 2010/0090797 A1 | 4/2010 | Koenig |

(56) References Cited

U.S. PATENT DOCUMENTS

| | | | | |
|---|---|---|---|---|
| 2010/0187033 | A1* | 7/2010 | Hayashi | B60K 11/04 180/68.4 |
| 2010/0194087 | A1* | 8/2010 | Yamamura | B62D 25/084 280/781 |
| 2010/0317484 | A1 | 12/2010 | Gillingham | |
| 2010/0317485 | A1 | 12/2010 | Gillingham | |
| 2011/0094818 | A1 | 4/2011 | Suzuki et al. | |
| 2011/0209937 | A1 | 9/2011 | Belzile et al. | |
| 2011/0240250 | A1 | 10/2011 | Azuma | |
| 2012/0031693 | A1 | 2/2012 | Deckard et al. | |
| 2014/0102819 | A1 | 4/2014 | Deckard et al. | |

FOREIGN PATENT DOCUMENTS

| | | |
|---|---|---|
| JP | 60067268 | 4/1985 |
| WO | WO-2008/005131 | 1/2008 |
| WO | WO2010/074990 | 7/2010 |

OTHER PUBLICATIONS

Photograph of the Redline Riot, dated Jun. 28, 2010, available http://www.buggyworksandrails.com/images/102_0657.JPG., at 1 page.
Troy Merrifield & Damon Flippo, Rise of the Machine: Let the "Revolution" Begin. One Seat at a Time., CartWheelin' Magazine, published at least as early as Jan. 2008, available at http://www.1redline.com/news_events/PDF/cart_wheelin_article.pdf, last accessed on Feb. 15, 2012, pp. 14-19.
Troy Merrifield, *Redline's Rockin' Riot*, UTV Off-Road Magazine, published in vol. 4, Issue 1, Feb./Mar. 2009, available at http://www.1redline.com/news_events/PDF/Redline_Riot_Article_01_2009.pdf., last accessed on Feb. 15, 2012, pp. 16-19.
Can-Am Specifications for Commander 1000, copyright 2010, 1 page.
Can-Am Specifications for Commander 800R, copyright 2010, 1 page.
Can-Am, *An 85-HP Side-By-Side. No, that's not a typo.*, dated Jun. 25, 2010, 3 pages.
International Search Report of the International Searching Authority in PCT/US2011/046395, Sep. 4, 2012, 6 pages.
Written Opinion of the International Searching Authority in PCT/US2011/046395, Feb. 3, 2013, 7 pages.
International Preliminary Report on Patentability in PCT/US2011/046395, May 28, 2013, 31 pages.
Demand and Article 34 Amendment in PCT/US2011/046395, Dec. 5, 2012, 31 pages.
2nd Written Opinion of the International Searching Authority in PCT/US2011/046395, Mar. 1, 2013, 9 pages.
Honda 89 FL400R Pilot Service Manual, Honda Motor co., Ltd., 1988, 265 pages.
Communication pursuant to Article 94(3) EPC in European patent application 11745641.8, Feb. 13, 2014, 4 pages.
R161 Communication in European patent application 11745641.8, May 7, 2013, 2 pages.
Response to R161 Communication in European patent application 11745641.8, Nov. 6, 2013, 18 pages.
2016 MUDPRO 700 Limited, Artic Cat, http://www.articcat.com/dirt/atvs/model/2016-en-mudpro-700-limited/, copyright 2015, 23 pages.
Renegade X MR 1000R, Can-Am, http://can-am.brp.com/off-road/atv/renegade/renegade-x-mr-1000R.html, copyright 2003-2015, 12 pages.
Radiator Relocation Kit for Polaris Scrambler, High Lifter, http://www.highlifter.com/p-4598-radiator-relocation-kit-for-polaris-scrambler-8501000-see-apps.aspx, last accessed Nov. 4, 2015, 1 page.
Radiator Relocation Kit—Polaris Sportsman 550/850, High Lifter, http://www.highlifter.com/p-2686-radiator-relocation-kit-polaris-sportsman-550850-see-apps.aspx, last accessed Nov. 4, 2015, 2 pages.
Diver Down Snorkel for Polaris Scrambler 850/1000, High Lifter, http://www.highlifter.com/p-4687-diver-down-snorkel-for-polaris-scrambler-8501000-see-apps.aspx, last accessed Nov. 4, 2015, 1 page.

* cited by examiner

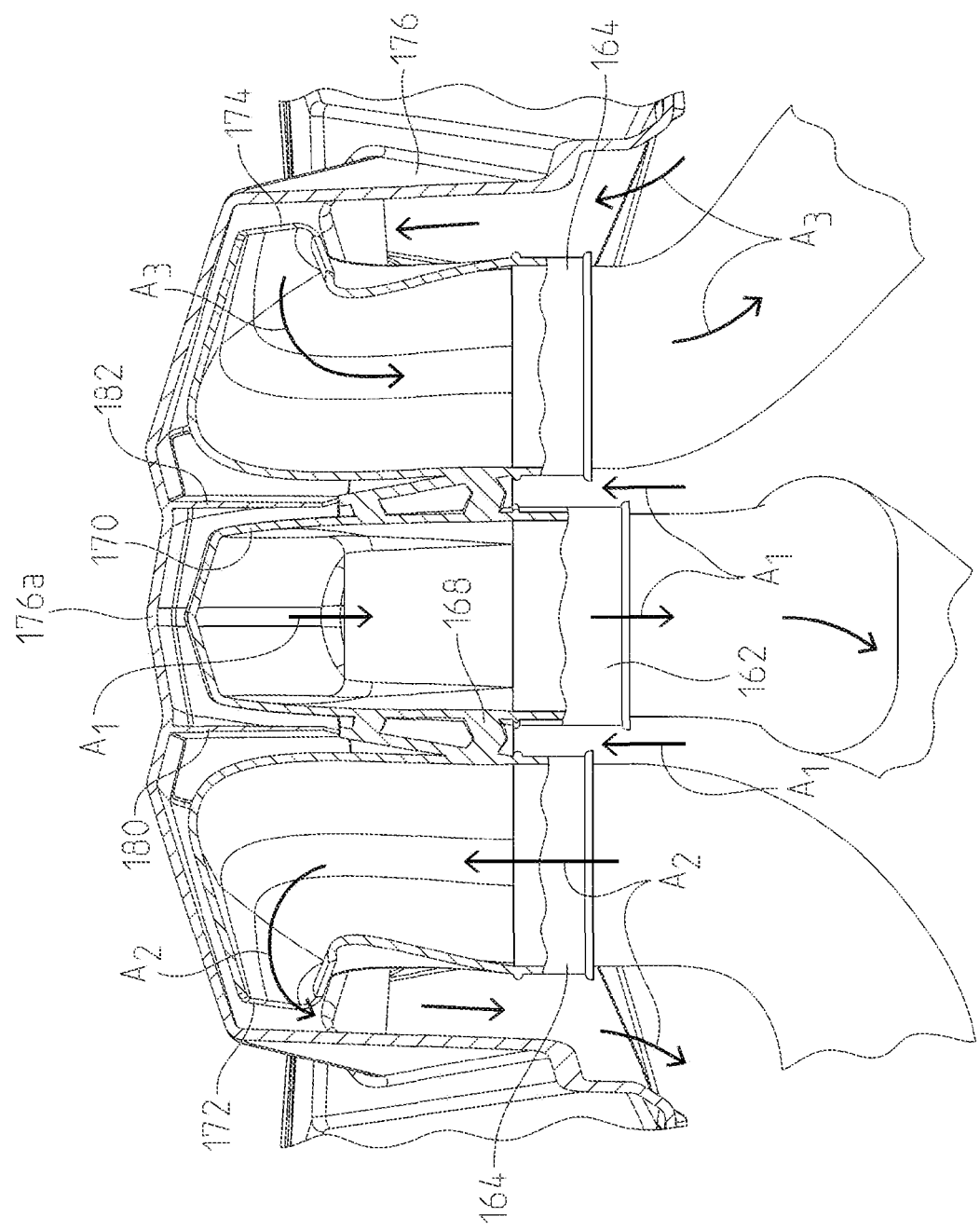

ALL-TERRAIN VEHICLE

FIELD OF THE DISCLOSURE

The present invention relates to an all-terrain vehicle and, more particularly, to an all-terrain utility vehicle configured to operate in mud and water conditions.

BACKGROUND AND SUMMARY OF THE DISCLOSURE

Generally, all-terrain vehicles ("ATVs") and utility vehicles ("UVs") are used to carry at least one person over a variety of terrains. For example, the ATVs and UVs are configured to traverse dry dirt trails, paved roads, and wet trails with deep water and/or mud conditions.

However, when the ATVs and UVs are traversing deep mud and/or water conditions, the air intake and/or cooling assembly of the powertrain assembly may be clogged with mud and/or submerged in water. As such, portions of the powertrain assembly may become damaged and/or the ATVs and UVs may be prevented from operating due to the lack of air provided to the powertrain assembly for combustion and/or cooling. Therefore, a need exists for an ATV or UV configured to operate in deep mud and water conditions.

SUMMARY OF THE DISCLOSURE

According to an illustrative embodiment of the present disclosure, an all-terrain vehicle ("ATV") includes a plurality of ground engaging members and a frame supported above a ground surface by the plurality of ground engaging members. The frame extends along a longitudinal centerline of the ATV. The ATV further includes an operator seat supported by the frame, an engine supported by the frame, and a continuously variable transmission ("CVT") supported by the frame and operably coupled to the engine. Additionally, the ATV includes a CVT cooling air inlet fluidly coupled to the CVT and positioned forward of a forward end of the operator seat, and a CVT cooling air outlet fluidly coupled to the CVT and positioned forward of the forward end of the operator seat.

According to another illustrative embodiment of the present disclosure, an all-terrain vehicle ("ATV") comprises a plurality of ground engaging members and a frame supported by the plurality of ground engaging members. The frame extends along a longitudinal centerline of the ATV. The ATV further includes an operator seat supported by the frame, first and second footwells positioned below the operator seat, an engine supported by the frame, and a continuously variable transmission ("CVT") supported by the frame and operably coupled to the engine. The ATV also includes a CVT cooling air inlet fluidly coupled to the CVT and positioned forward of the operator seat and along the centerline, and a CVT cooling air outlet fluidly coupled to the CVT and positioned forward of the operator seat and laterally inward of the footwells. Additionally, the ATV includes an engine air inlet fluidly coupled to the engine and positioned forward of the operator seat and laterally inward of the footwells.

According to a further illustrative embodiment of the present disclosure, an all-terrain vehicle ("ATV") comprises a plurality of ground engaging members and a frame supported above a ground surface by the plurality of ground engaging members. The frame extends along a longitudinal centerline of the ATV. Additionally, the ATV includes an operator seat supported by the frame, an engine supported by the frame, and a continuously variable transmission ("CVT") supported by the frame and operably coupled to the engine. The ATV further includes a cooling assembly including a radiator and a plurality of fans fluidly coupled to the radiator. A forward end of the radiator is positioned rearward of a forward end of the ATV. Additionally, the plurality of fans are angled laterally away from the longitudinal centerline.

According to yet another illustrative embodiment of the present disclosure, an all-terrain vehicle ("ATV") comprises a plurality of ground engaging members and a frame supported above a ground surface by the plurality of ground engaging members. The frame extends along a longitudinal centerline of the ATV. Additionally, the ATV comprises an operator seat supported by the frame, an engine supported by the frame, and a continuously variable transmission ("CVT") supported by the frame and operably coupled to the engine. The ATV also includes a cooling assembly including a radiator and at least one fan positioned above the radiator. A forward end of the radiator is positioned rearward of a forward end of the ATV.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 22 is a cross-sectional view of the snorkels of FIG. 21B, taken along line 22-22 of FIG. 18;

Corresponding reference characters indicate corresponding parts throughout the several views. The drawings represent embodiments of the present invention and the features of the drawings are shown to scale.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIGS. 1-8, an illustrative embodiment of an all-terrain vehicle ("ATV") 2 is shown. Illustratively vehicle 2 may be configured for deep mud and water conditions, as disclosed further herein. Vehicle 2 includes a plurality of ground-engaging members 4, illustratively front wheels 6 and rear wheels 8. Front and rear wheels 6, 8 may include approximately 28-34 inch tires and approximately 12-14 inch metal wheels. In one embodiment, one or more of ground-engaging members 4 may be replaced with tracks, such as the Prospector II Tracks available from Polaris Industries Inc. of Medina, Minn. or non-pneumatic tires, such as those shown in U.S. Pat. No. 8,176,957 and U.S. Pat. No. 8,104,524, the complete disclosures of which are expressly incorporated herein by reference. Vehicle 2 is configured for off-road conditions, including deep mud and/or water conditions. Additionally, vehicle 2 is configured to operate on trails and has a width of approximately 45-50 inches and a wheel base length extending from the axis of rotation of front wheels 6 to the axis of rotation of rear wheels 8 of approximately 50-65 inches.

Figure 6:
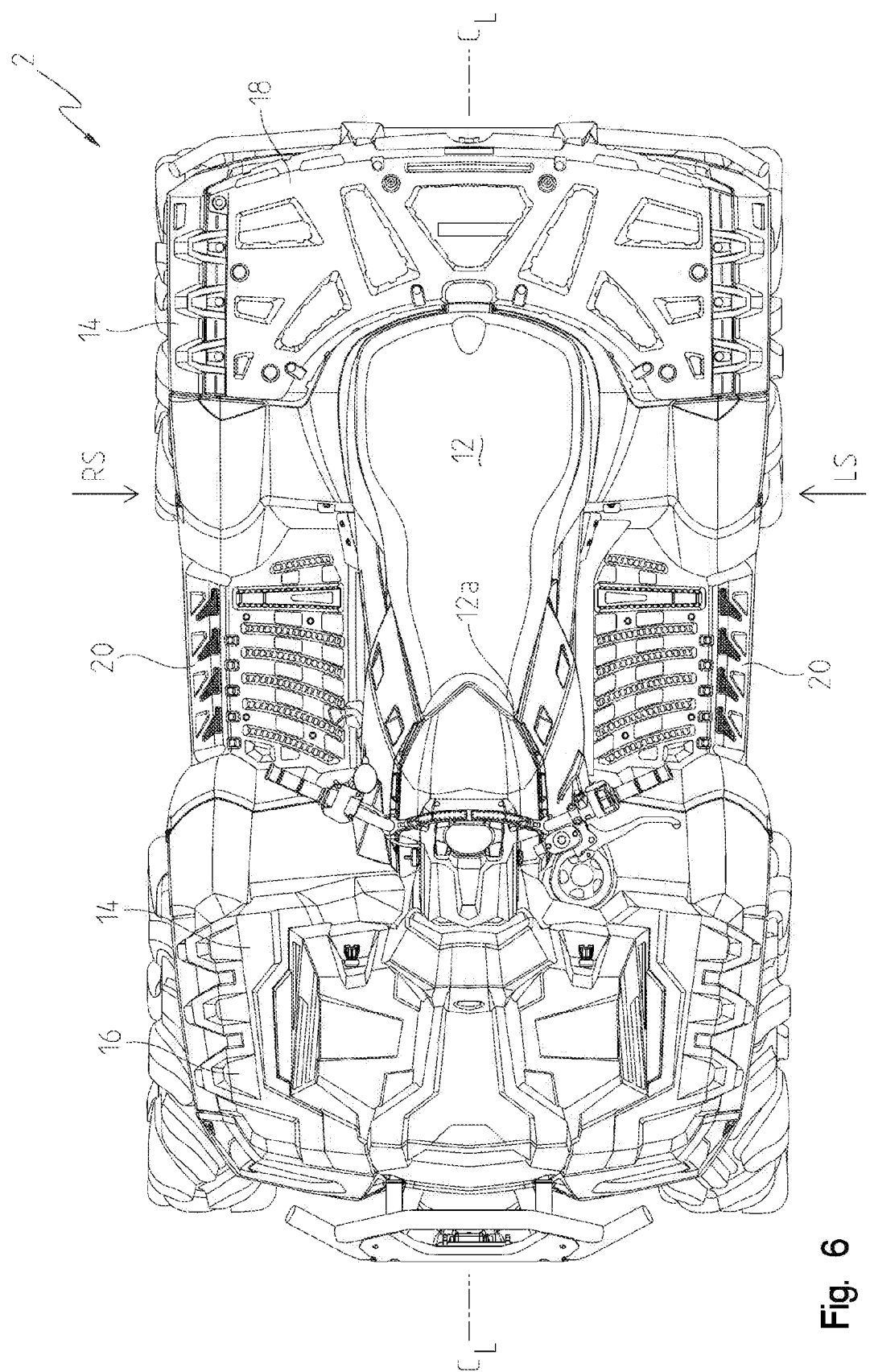
FIG. 6 is a top view of the vehicle of FIG. 1.
Figure 7:
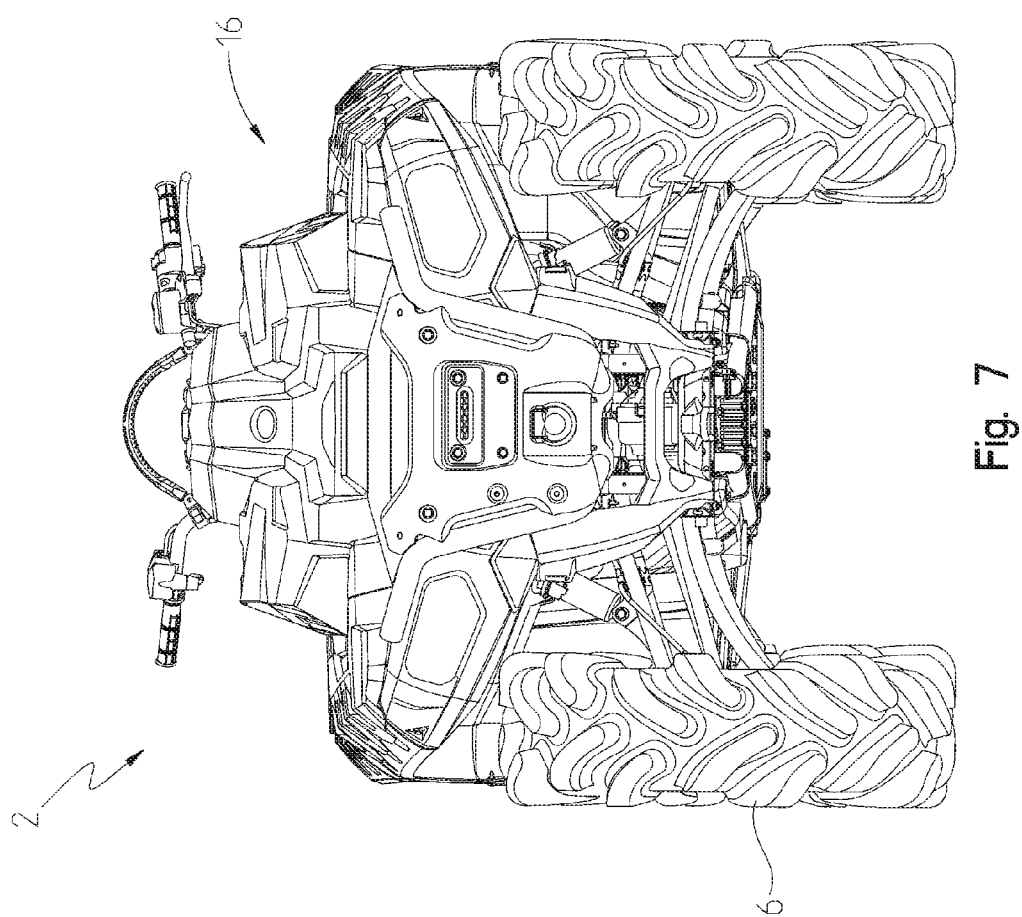
FIG. 7 is a front view of the vehicle of FIG. 1.
Figure 8:
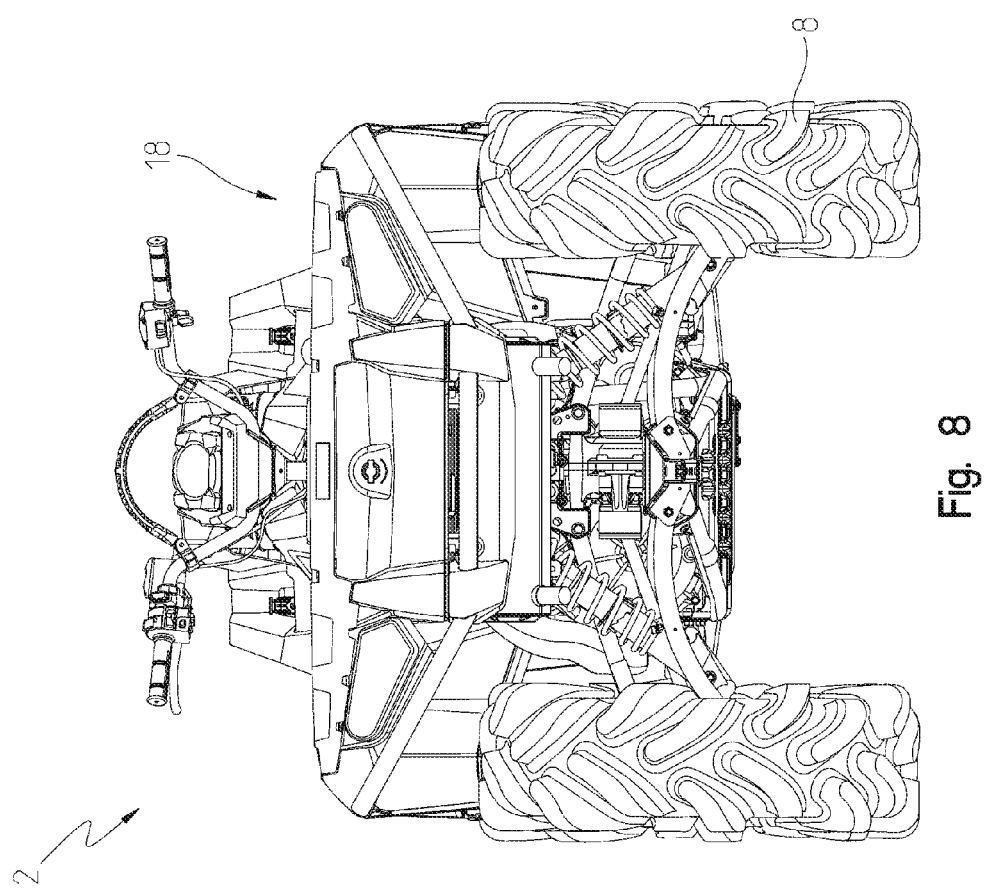
FIG. 8 is a rear view of the vehicle of FIG. 1.

Vehicle 2 further includes a frame assembly 10 (FIGS. 9 and 10) supported above a ground surface G (FIG. 4) by ground-engaging members 4. Frame assembly 10 extends along a longitudinal centerline $C_L$ of vehicle 2 (FIG. 6). Frame assembly 10 supports a seat 12, illustratively a straddle seat, and a plurality of body panels 14, which includes a hood assembly 16, a cargo area 18, and a plurality of footwells 20. Seat 12 may be configured to support the operator of vehicle 2 and a passenger seated rearward of the operator. Additionally, frame assembly 10 supports a powertrain assembly (FIG. 24) of vehicle 2, including at least an engine 24, a continuously variable transmission ("CVT") 26, a front differential (not shown), and a rear differential (not shown). Powertrain assembly 22 may operate at a horsepower of up to 90 hp and engine 24 may have a capacity of 500-1000 cc. A steering assembly 28 cooperates with powertrain assembly 22 to operate vehicle 2.

Figure 9:
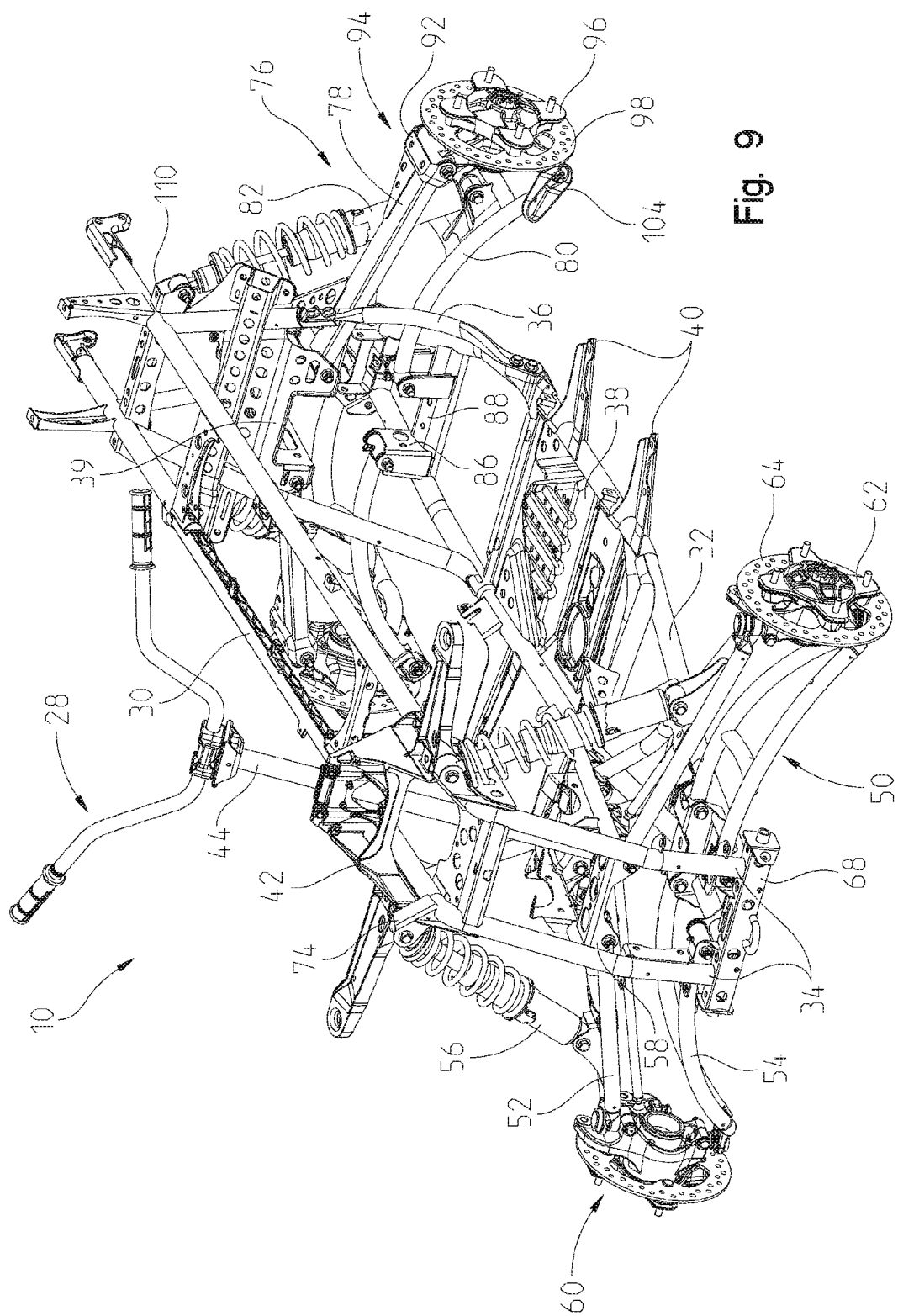
FIG. 9 is a left front perspective view of a frame assembly of the vehicle of FIG. 1.
Figure 10:
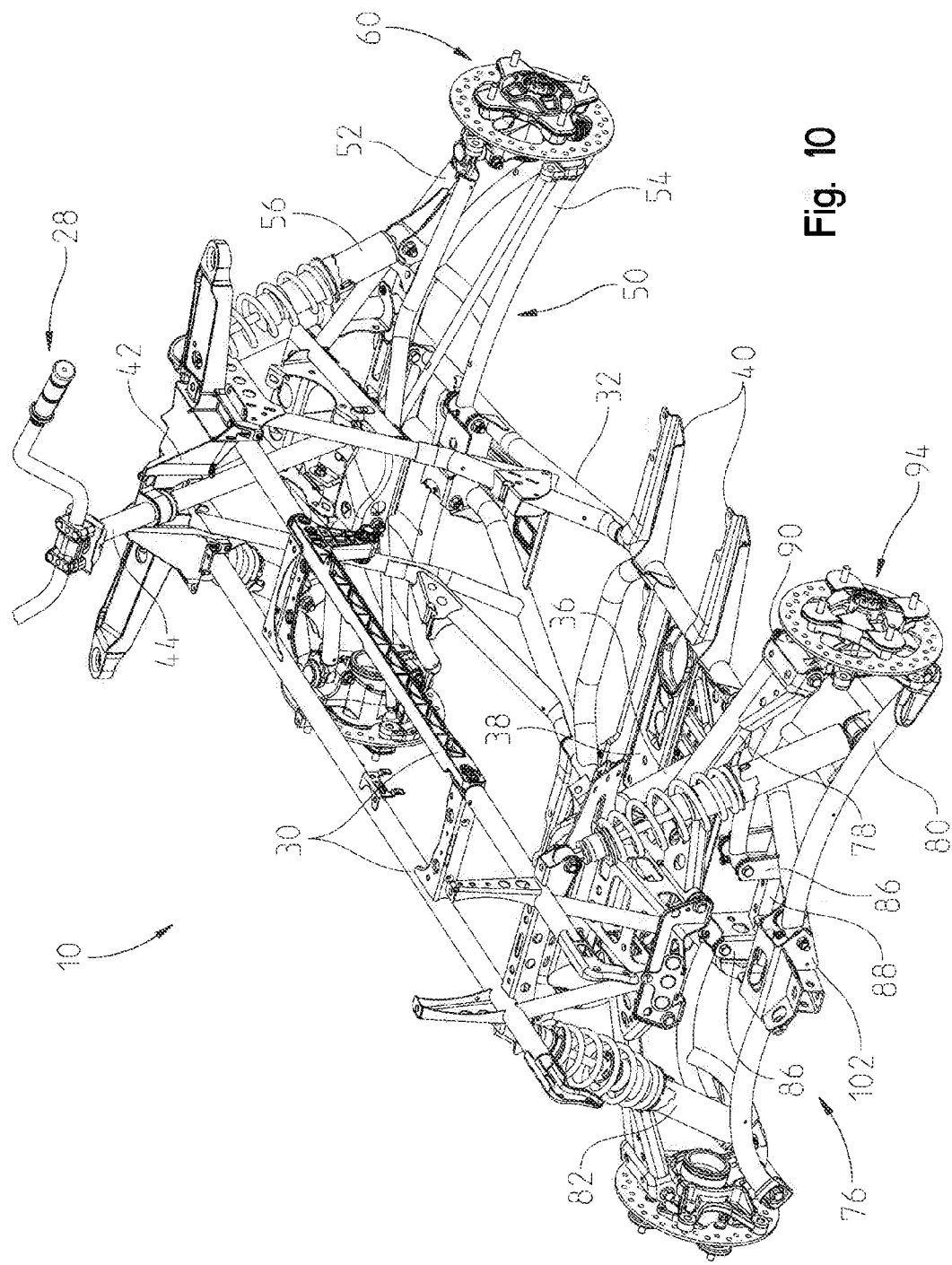
FIG. 10 is a right rear perspective view of the frame assembly of FIG. 9.

Referring to FIGS. 9 and 10, frame assembly 10 includes upper longitudinally-extending frame members 30 and lower longitudinally-extending frame members 32. Upper longitudinally-extending members 30 support at least seat 12 and cargo area 18. Upper and lower longitudinally-extending frame members 30, 32 are generally coupled together through front upstanding members 34 and rear upstanding members 36. Frame assembly 10 further includes a support pan or plate 38 and a brace 39 for supporting engine 24 (FIG. 24) and/or other components of powertrain assembly 22. A plurality of braces 40 are extend laterally outwardly from lower longitudinally-extending frame members 32 to support footwells 20 (FIG. 1), as detailed further herein.

Figure 36:
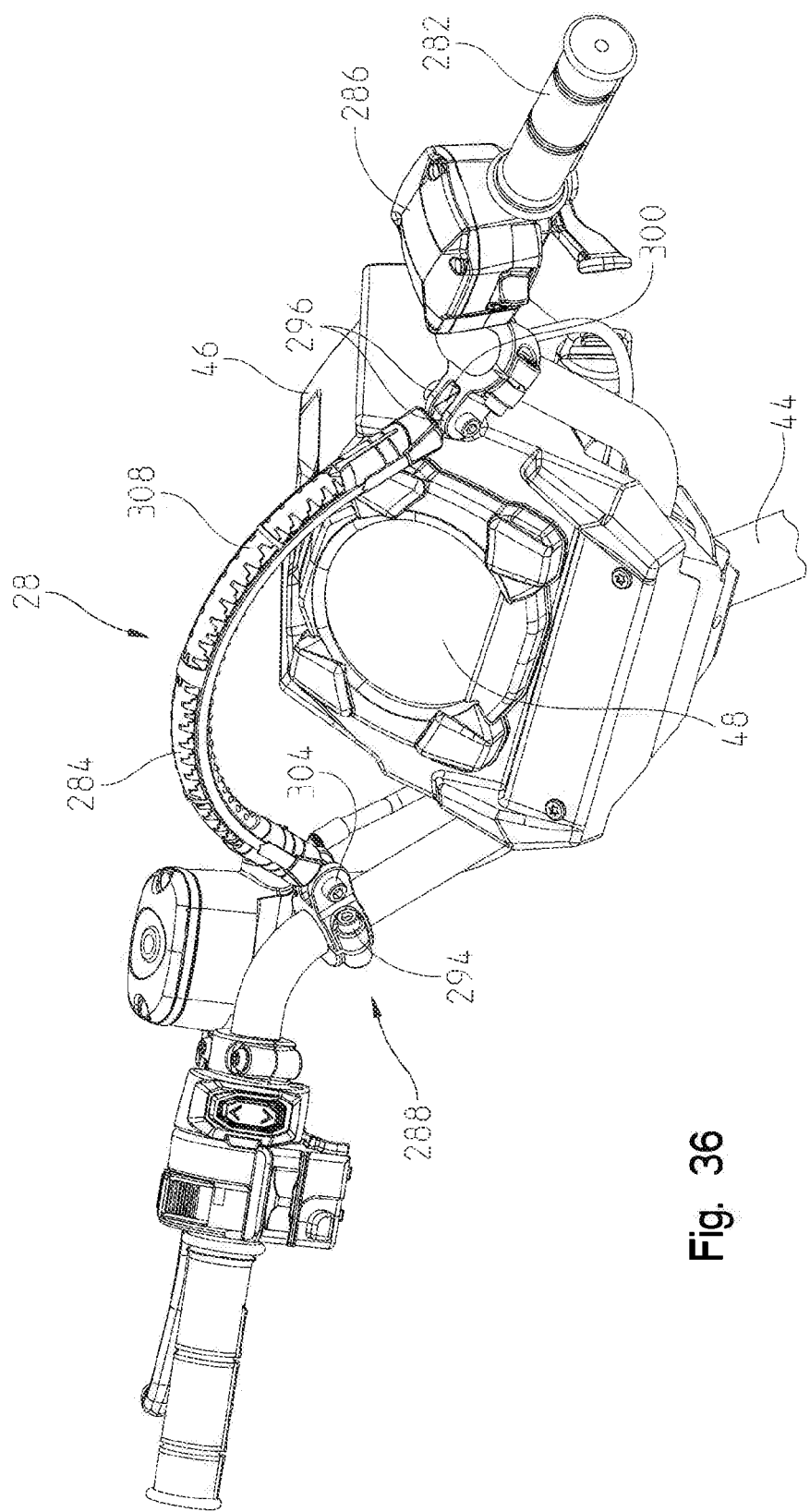
FIG. 36 is a right rear perspective view of handlebar assembly of the vehicle of FIG. 1.

Referring still to FIGS. 9 and 10, frame assembly 10 further includes a steering mount 42 for supporting a portion of steering assembly 28, such as a steering column 44. Additionally, steering mount 42 also may support a dash or body member 46 for a gauge 48 (FIG. 36). Gauge 48 may be any electrical or mechanical gauge configured to provide information (e.g., speed, fuel level, terrain, GPS, etc.) to the operator. In one embodiment, body member 46 may include a key switch and other electrical components of vehicle 2.

Figure 11:
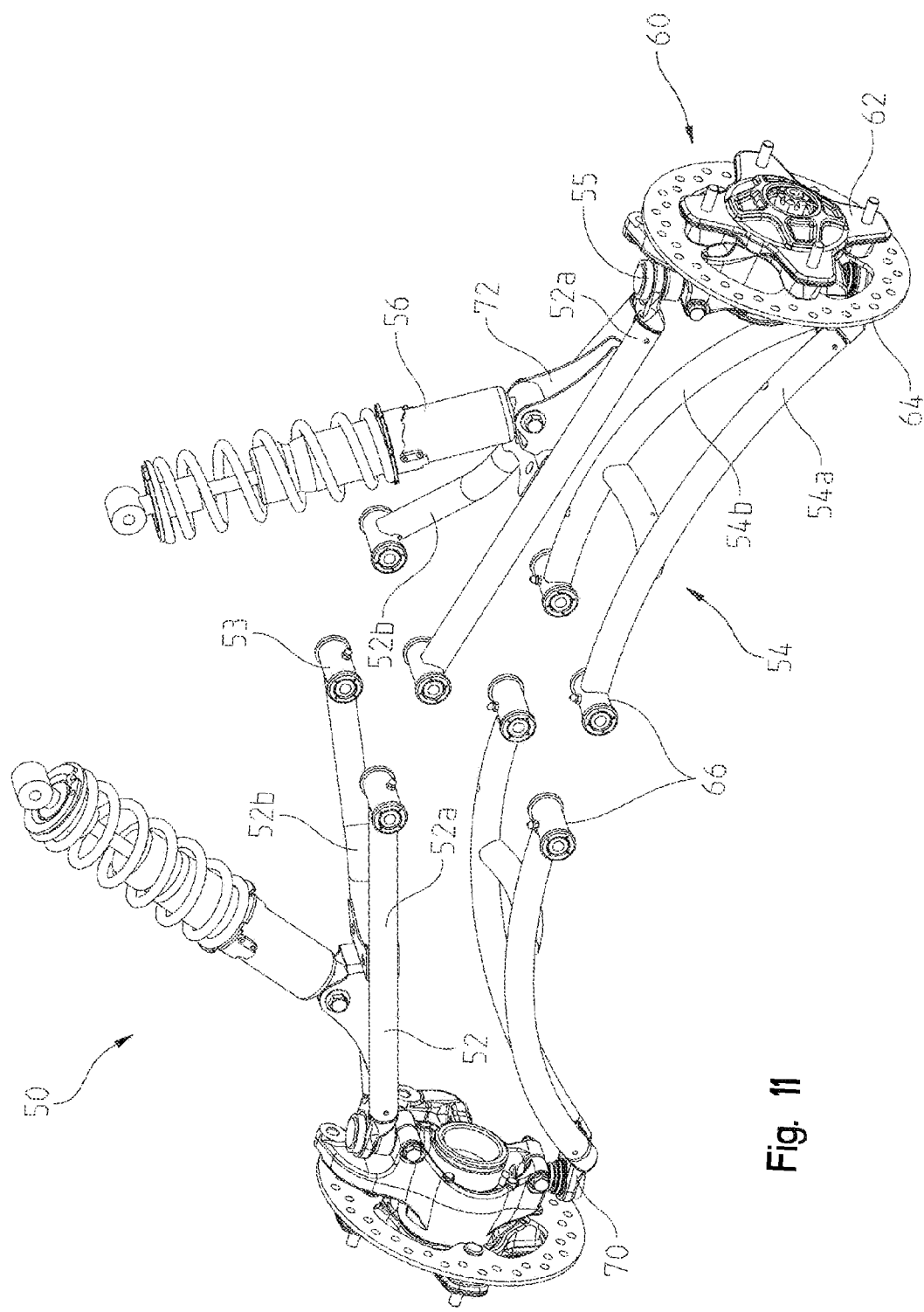
FIG. 11 is a left front perspective view of a front suspension assembly of the vehicle of FIG. 1.
Figure 12:
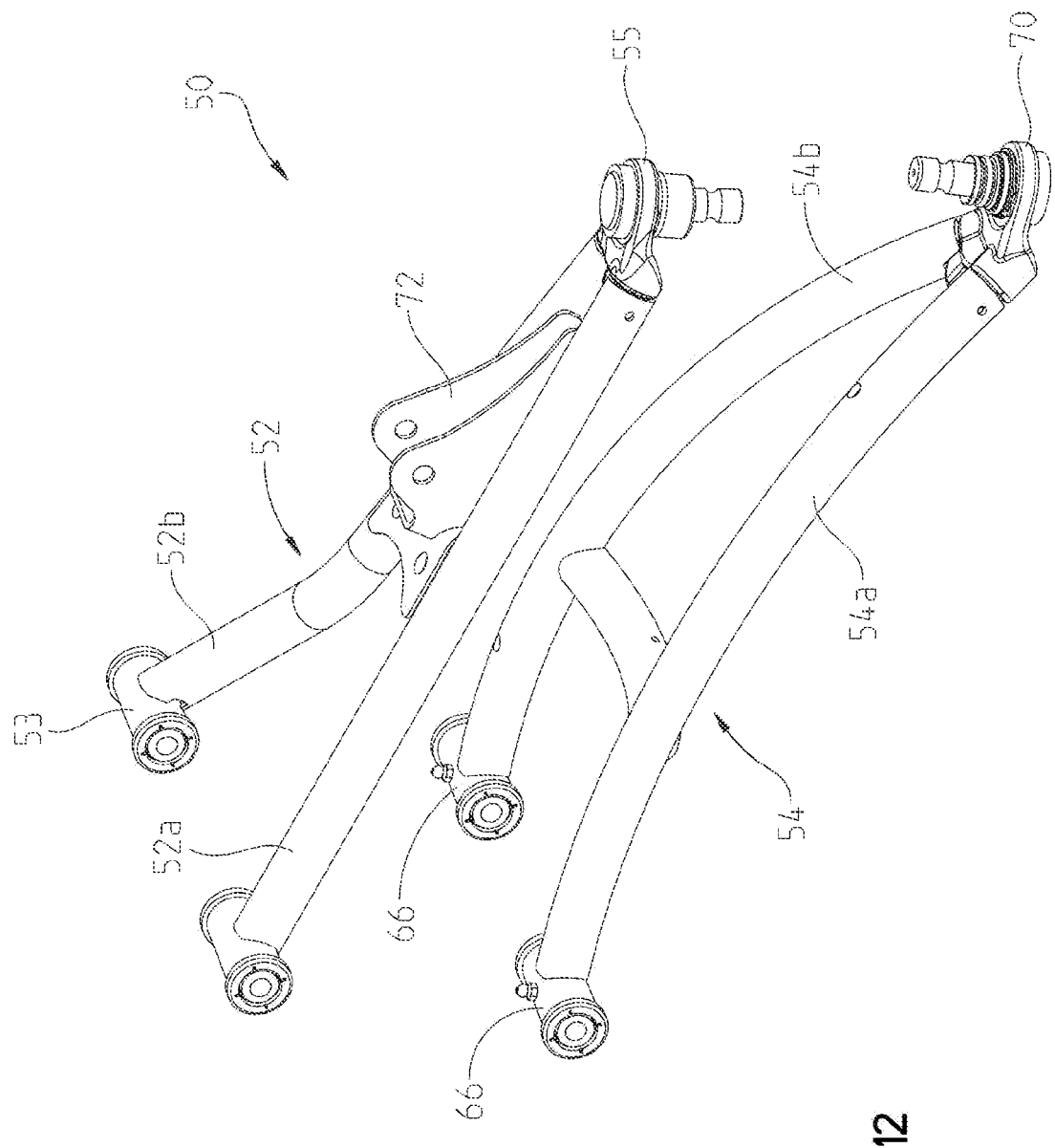
FIG. 12 is a left front perspective view of an upper control arm and a lower control arm of the front suspension assembly of FIG. 11.

Referring now to FIGS. 9-14, vehicle 2 includes a front suspension assembly 50 and a rear suspension assembly 76 supported by frame assembly 10. As shown in FIGS. 9, 11, and 12, front suspension assembly 50 includes an upper control arm 52, a lower control arm 54, and a linear force actuator, such as a shock absorber 56. An inner end of upper control arm 52 includes mounting members 53 which are pivotably coupled to a brace 58 of frame assembly 10 and an outer end of upper control arm 52 includes a mounting member 55 which is pivotably coupled to a front hub assembly 60 of vehicle 2. Front hub assembly 60 includes a hub portion 62 and a brake disc 64 to form a portion of front wheels 6. Upper control arm 52 includes a forward member 52a and a rearward member 52b. Forward member 52a extends in a straight or linear configuration between mounting members 53, 55. Rearward member 52b includes a rearward bend such that a distance between the outer ends of members 52a, 52b is less than a distance between the inner ends of members 52a, 52b.

Lower control arms 54 are positioned vertically below upper control arms 52. An inner end of lower control arm 54 includes mounting members 66 which are pivotably coupled to a brace 68 of frame assembly 10 and an outer end of lower control arm 54 includes a mounting member 70 which is pivotably coupled to front hub assembly 60. Lower control arm 54 includes a forward member 54a and a rearward member 54b. Members 54a, 54b each extend in a continuous curvature between mounting members 66, 70. In other words, members 54a, 54b have an arcuate profile with a constant radius extending continuously between mounting members 66, 70. As such, the ground clearance of vehicle 2 is increased by the curved configuration of members 54a, 54b. For example, the ground clearance of vehicle 2 may be approximately 14 inches.

Shock absorbers 56 of front suspension assembly 50 include a lower end pivotably coupled to a bracket 72 of upper control arms 52. Additionally, an upper end of shock absorbers 56 is pivotably coupled to a bracket 74 of frame assembly 10. As shown in FIG. 9, bracket 74 is coupled to front upstanding members 34 and upper longitudinally-extending members 30.

Figure 13:
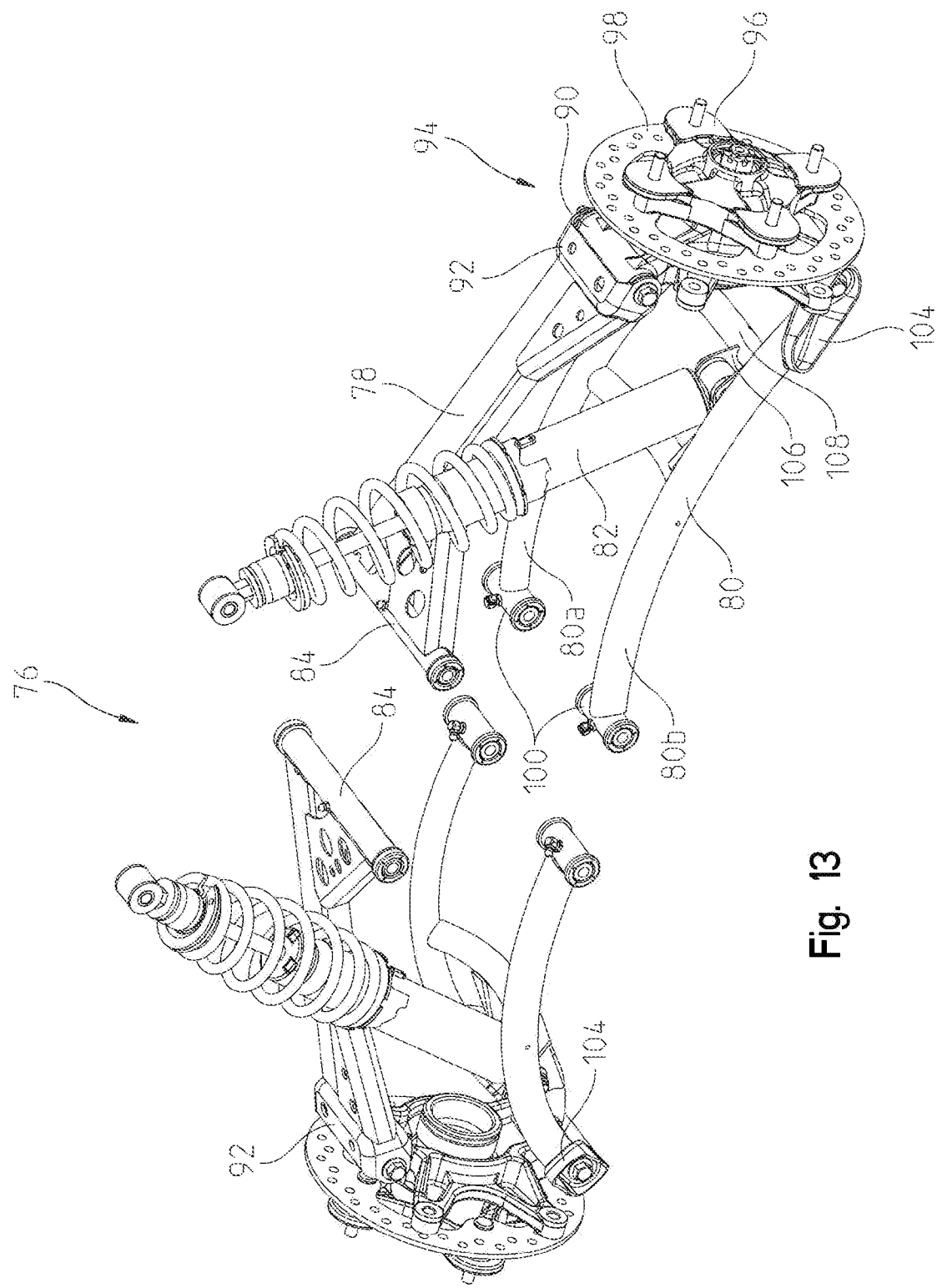
FIG. 13 is a right rear perspective view of a rear suspension assembly of the vehicle of FIG. 1.
Figure 14:
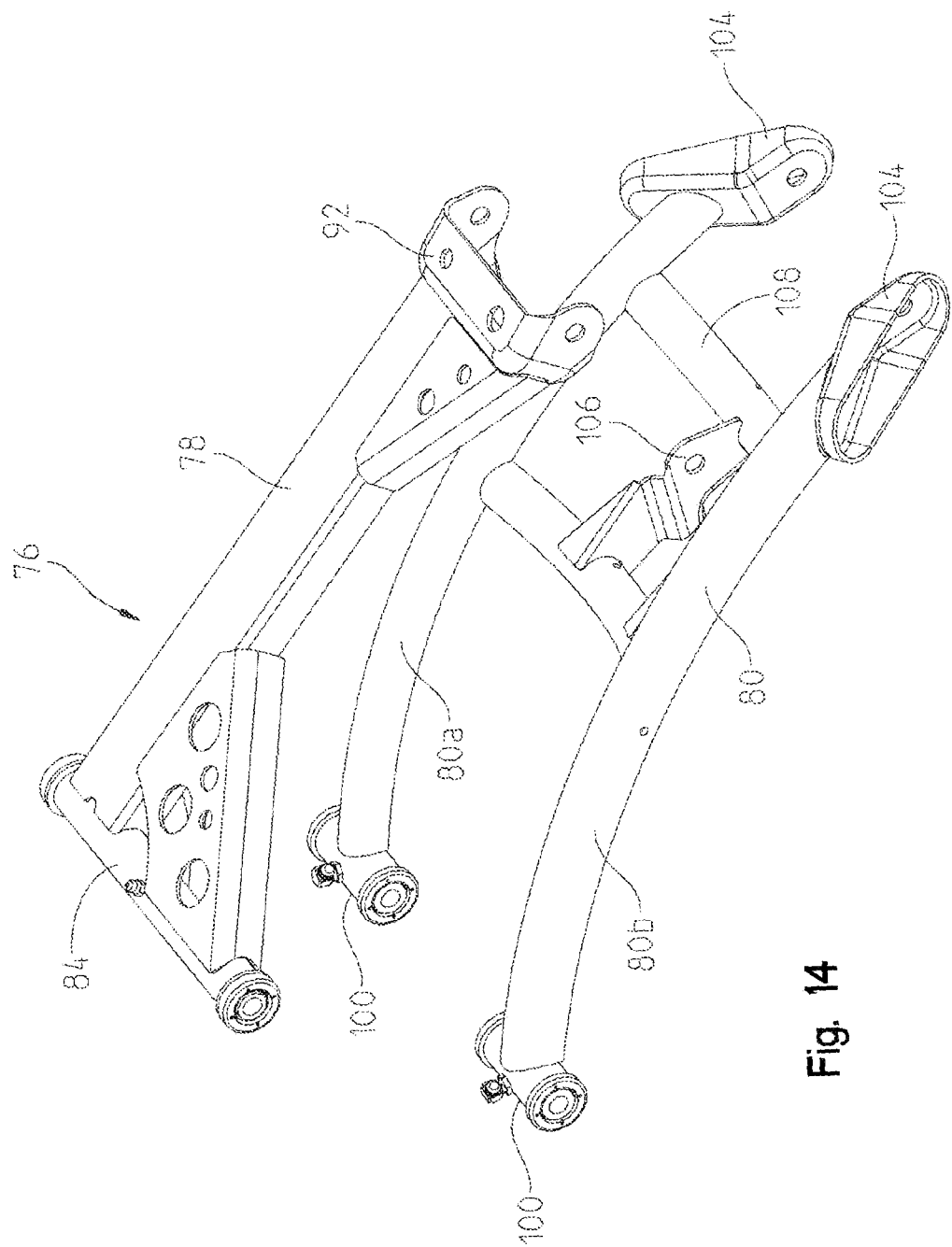
FIG. 14 is a right rear perspective view of an upper control arm and a lower control arm of the rear suspension assembly of FIG. 13.

Referring to FIGS. 10, 13 and 14, rear suspension assembly 76 includes an upper control arm 78, a lower control arm 80, and a linear force actuator, such as a shock absorber 82. An inner end of upper control arm 78 includes mounting members 84 which are pivotably coupled to a bracket 86 supported on a brace 88 of frame assembly 10. An outer end of upper control arm 78 includes a mounting member 90 which is pivotably coupled to a bracket 92 on a rear hub assembly 94 of vehicle 2. Rear hub assembly 94 includes a hub portion 96 and a brake disc 98 to form a portion of rear wheels 8. Upper control arm 78 extends in a straight or linear configuration between mounting members 84, 90.

Lower control arms 80 are positioned vertically below upper control arms 78. An inner end of lower control arm 80 includes mounting members 100 which are pivotably coupled to a bracket 102 of frame assembly 10 and an outer end of lower control arm 80 includes a mounting member 104 which is pivotably coupled to a portion of rear hub assembly 94. Lower control arm 80 includes a forward member 80a and a rearward member 80b. Members 80a, 80b extend in a continuous curvature between mounting members 100, 104. In other words, members 80a, 80b have an arcuate profile with a constant radius extending continuously between mounting members 100, 104. As such, the ground clearance of vehicle 2 is increased by the curved configuration of members 80a, 80b. For example, the ground clearance of vehicle 2 may be approximately 14 inches.

Shock absorbers 82 of rear suspension assembly 76 include a lower end pivotably coupled to a bracket 106 supported on a cross member 108 extending between members 80a, 80b of lower control arms 80. Additionally, an upper end of shock absorbers 82 are pivotably coupled a bracket 110 of frame assembly 10. As shown in FIG. 9, bracket 110 is coupled to rear upstanding members 36 and upper longitudinally-extending members 30.

Figure 15:
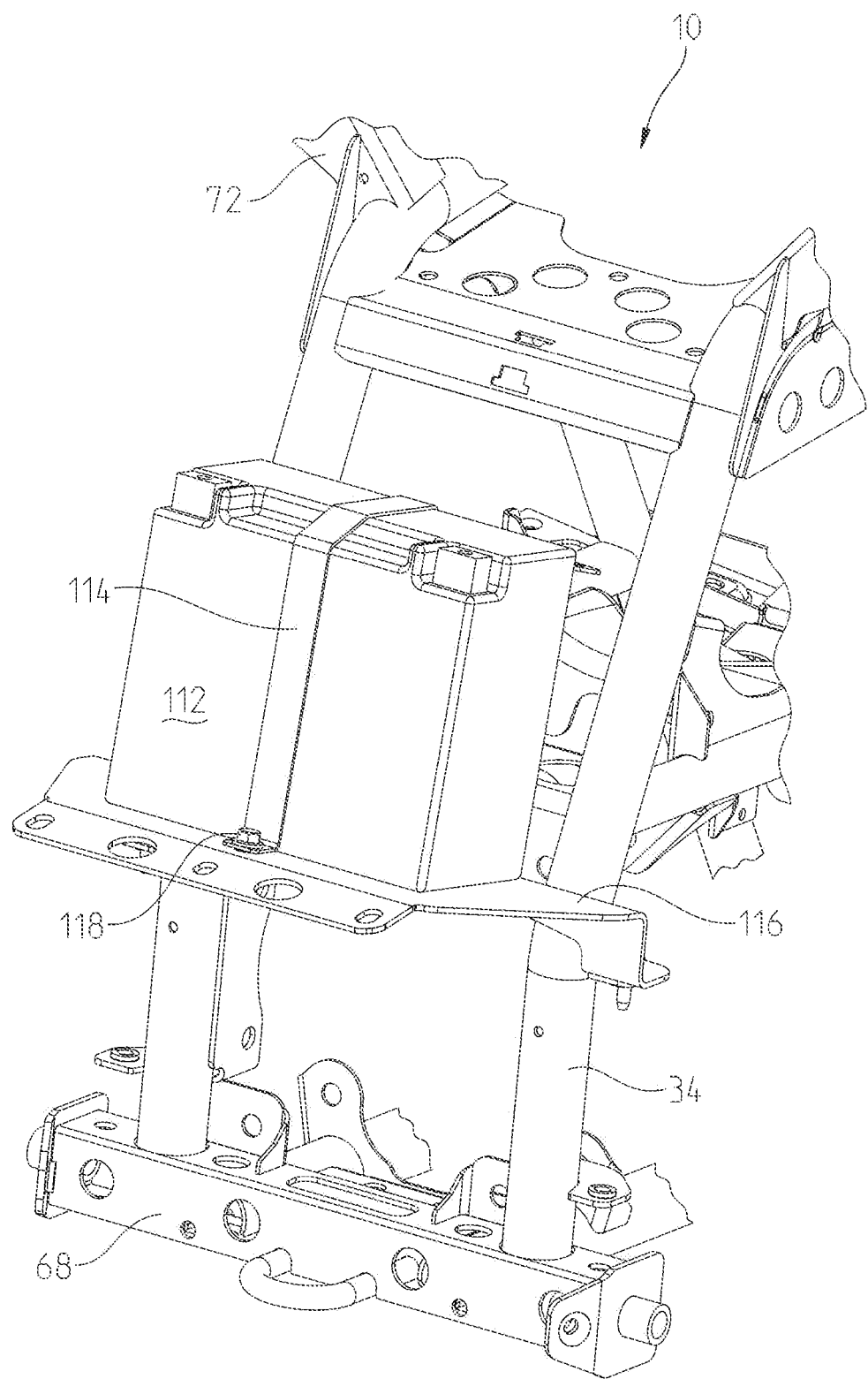
FIG. 15 is a left front perspective view of a battery of the vehicle of FIG. 1 supported by the frame assembly of FIG. 9.
Figure 16:
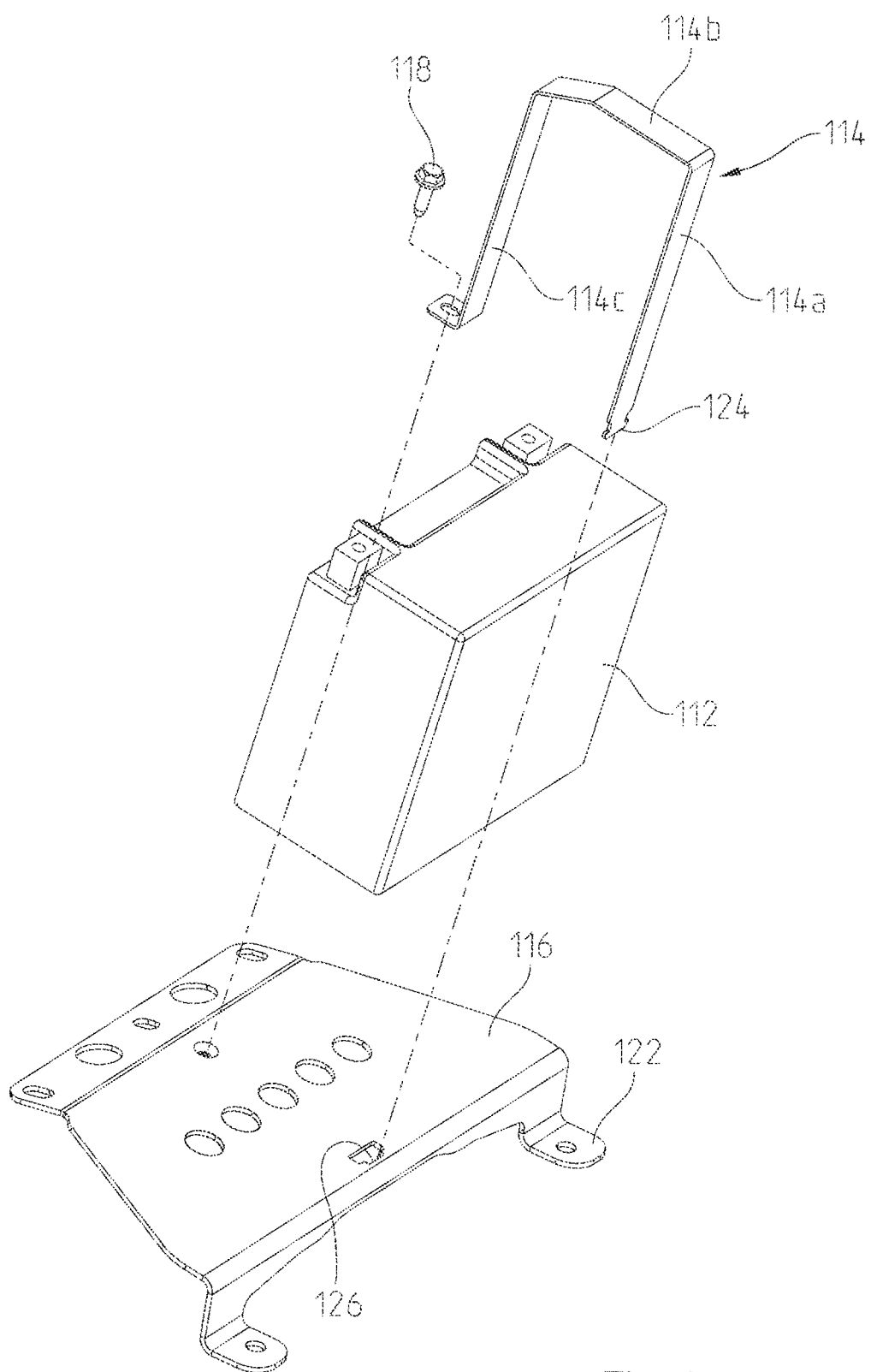
FIG. 16 is an exploded view of the battery, a retaining member, and a portion of the frame assembly of FIG. 15.
Figure 17:
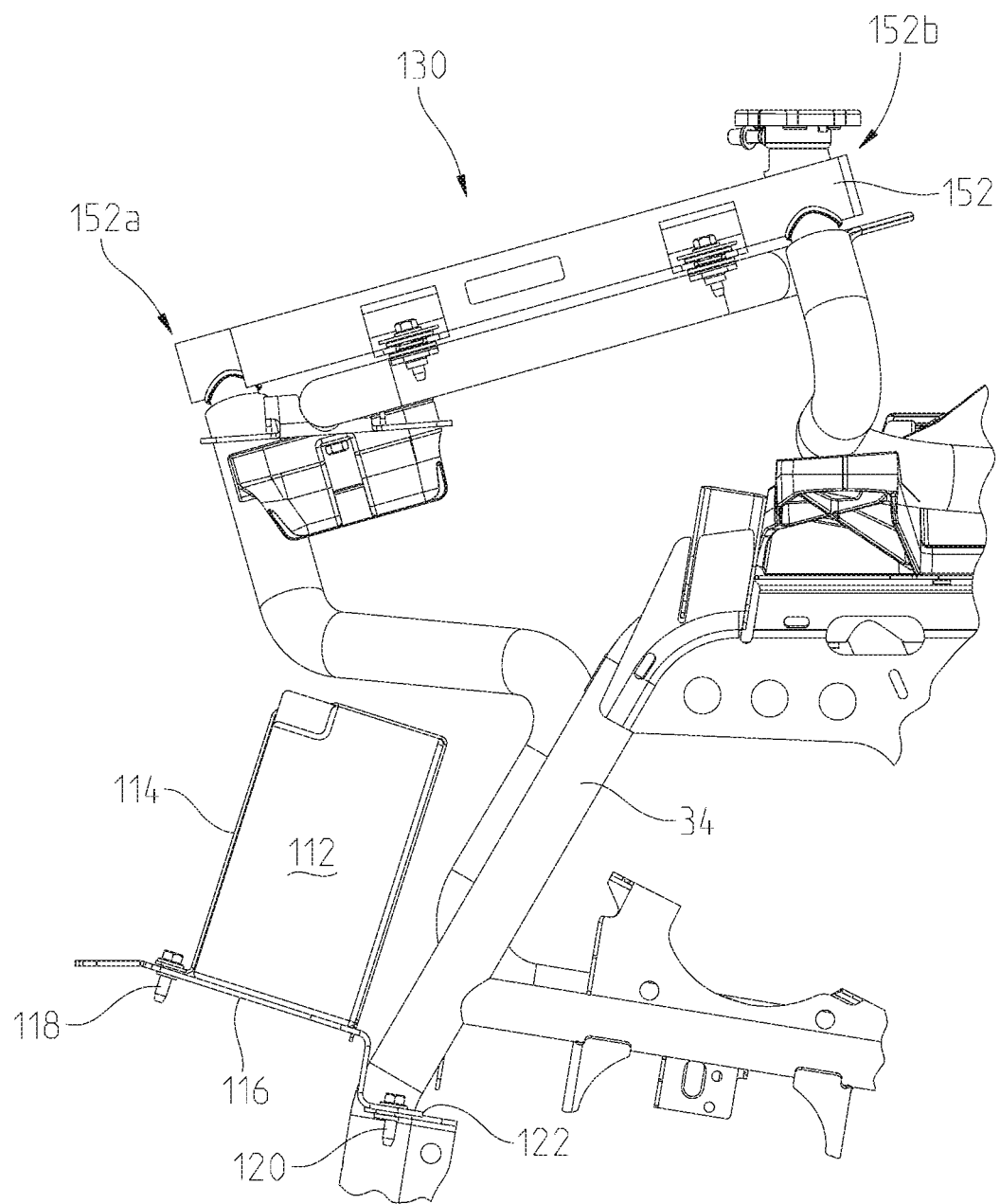
FIG. 17 is a side view of the battery of FIG. 15 and a cooling assembly of the vehicle of FIG. 1.

Referring to FIGS. 15-17, a battery assembly of vehicle 2 includes at least one battery 112. A retaining member 114 and a plate 116 couple battery 112 to frame assembly 10 with fasteners 118. More particularly, plate 116 is coupled to front upstanding members 34 of frame assembly 10 and extends in a longitudinally forward direction from front upstanding members 34. Illustrative plate 116 includes tabs 122 which are coupled to front upstanding members 34 with fasteners 120 (FIG. 17). Plate 116 has a horizontal surface on which battery 112 is positioned such that battery 112 is adjacent and forward of front upstanding members 34.

Battery 112 is retained on plate 116 with retaining member 114, which may be a strap, cable, or any other known retaining member configured to retain battery 112 on frame assembly 10. Illustratively, retaining member 114 has a rear portion 114a in contact with a rear face of battery 112, an upper portion 114b in contact with a top face of battery 112, and a front portion 114c in contact with a front face of battery 112. As such, retaining member 114 extends around a portion of battery 112 to retain battery 112 through a friction or interference fit. Retaining member 114 is coupled to a front portion of plate 116 with fastener 118 and is coupled to a rear portion of plate 116 with a catch member 124 formed on rear portion 114a of retaining member 114. More particularly, catch member 124 may have a hook, tab, or other profile configured to be received within an opening 126 of the rear portion of plate 116. In this way, battery 112 is removable from vehicle 2 by releasing fastener 118 and catch member 124 from plate 116 and removing retaining member 114.

Figure 18:
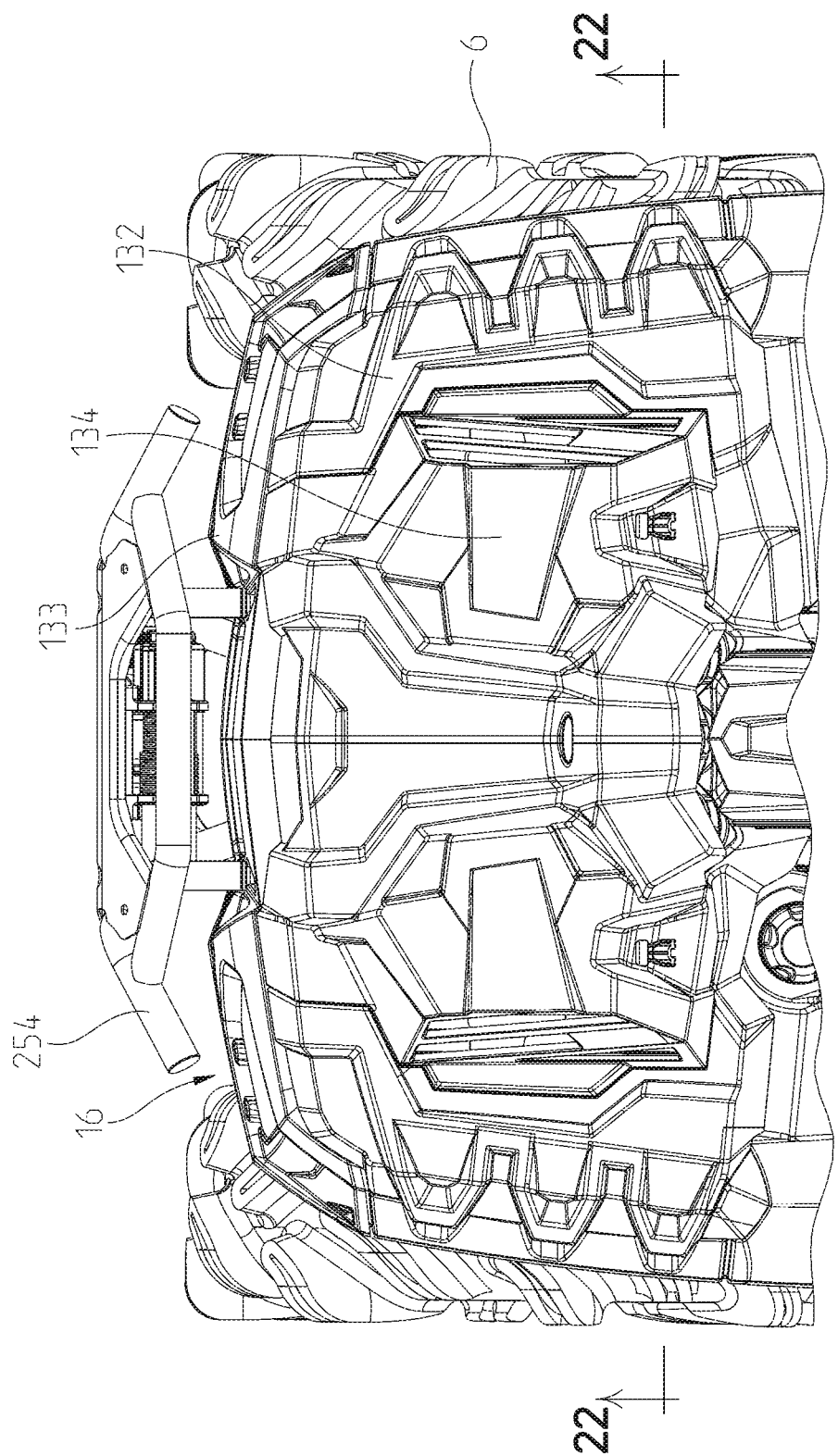
FIG. 18 is a top view of a hood assembly of the vehicle of FIG. 1.

Referring to FIG. 17, illustrative battery 112 is positioned at the front of vehicle 2 and vertically below a forward portion of a cooling assembly 130 of vehicle 2. As shown in FIGS. 18-20, cooling assembly 130 includes at least one fan 138 and a radiator 152 which are positioned below hood assembly 16, as disclosed further herein. In one embodiment, cooling assembly 130 includes dual fans 138 and a single radiator 152 positioned vertically below fans 138 which may increase air flow through radiator 152.

Hood assembly 16 includes a lower hood member 132 and an upper hood member 134. Lower hood member 132 and upper hood member 134 are generally positioned forward of a forward end 12a of operator seat 12 (FIG. 6) and upper hood member 134 may be positioned vertically above operator seat 12. Lower hood member 132 and upper hood member 134 may be comprised of a polymeric material and/or may be a composite material. In one embodiment, upper hood member 134 is removably coupled to lower hood member 132 with a hinge 159. For example, hinge 159 may be a Lock & Ride component available from Polaris Industries Inc. of Medina, Minn. In this way, upper mood member 134 may be removed to access cooling assembly 130, such as fans 138 and radiator 152 for cleaning and/or service.

Figure 19A:
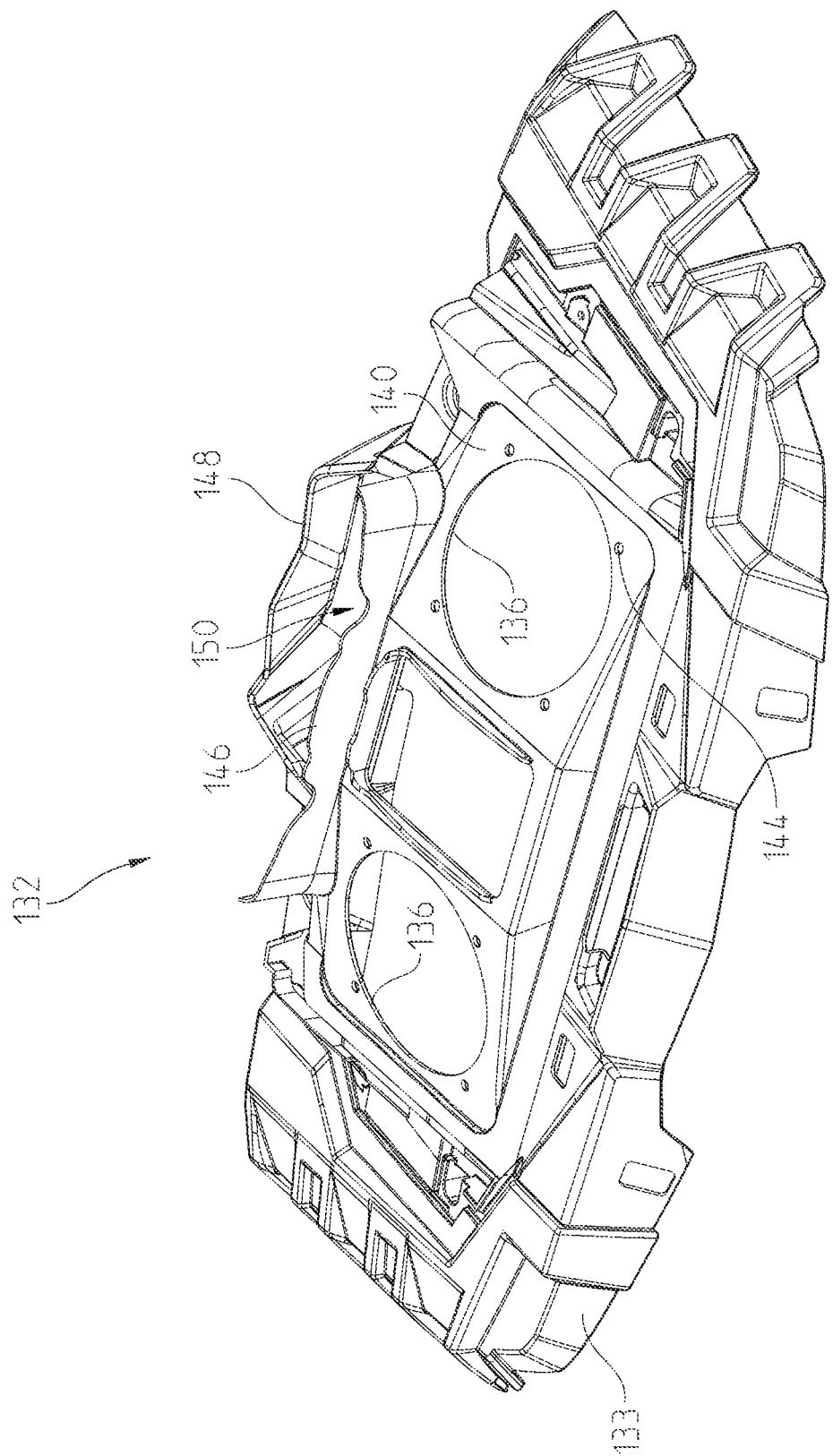
FIG. 19A is a left front perspective view of a lower hood member of the hood assembly of FIG. 18, including a support member for a plurality of fans of the cooling assembly.
Figure 19B:
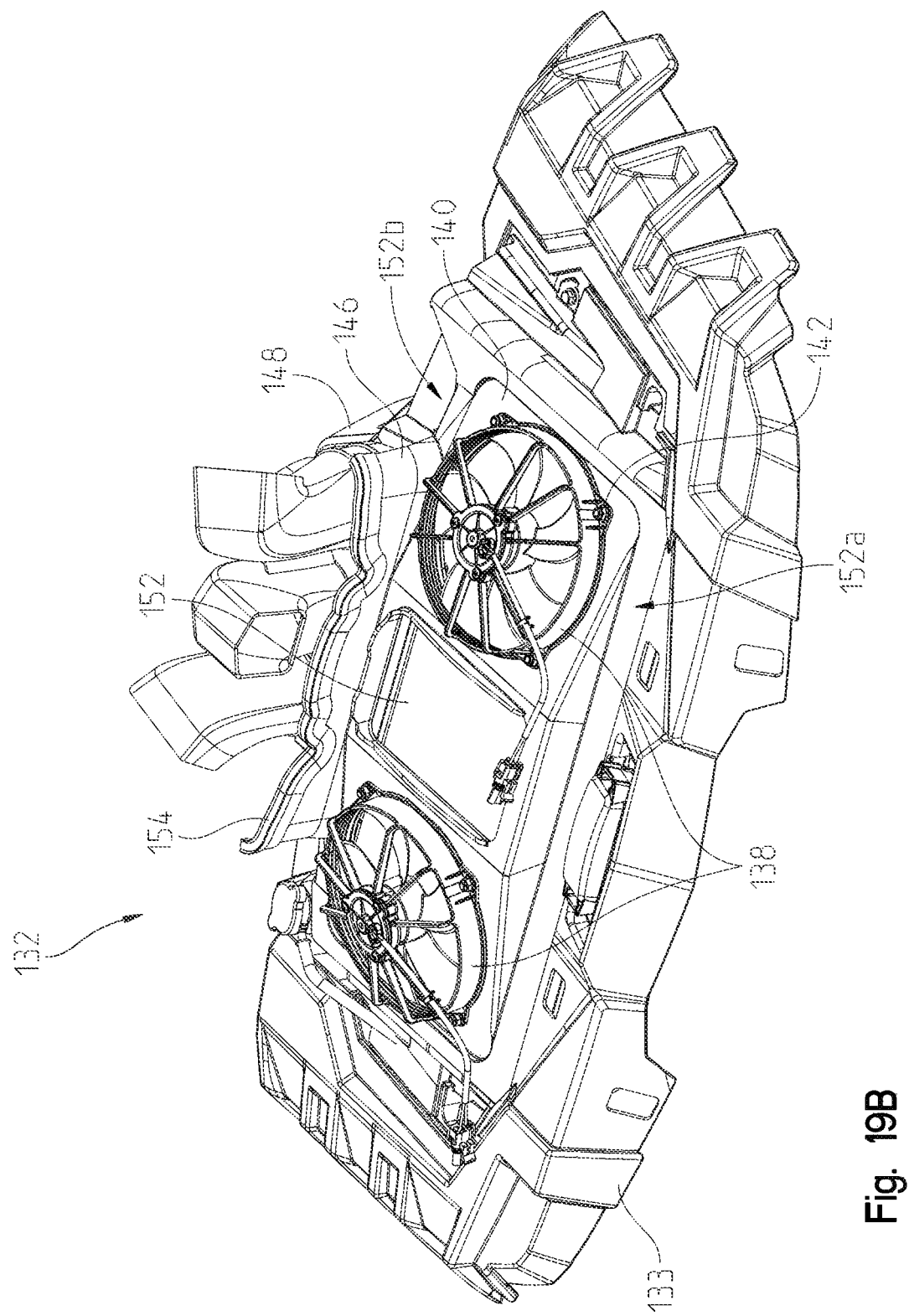
FIG. 19B is a left front perspective view of the lower hood member supporting the plurality of fans of the cooling assembly and a plurality of snorkels positioned rearward of the plurality of fans.
Figure 19D:
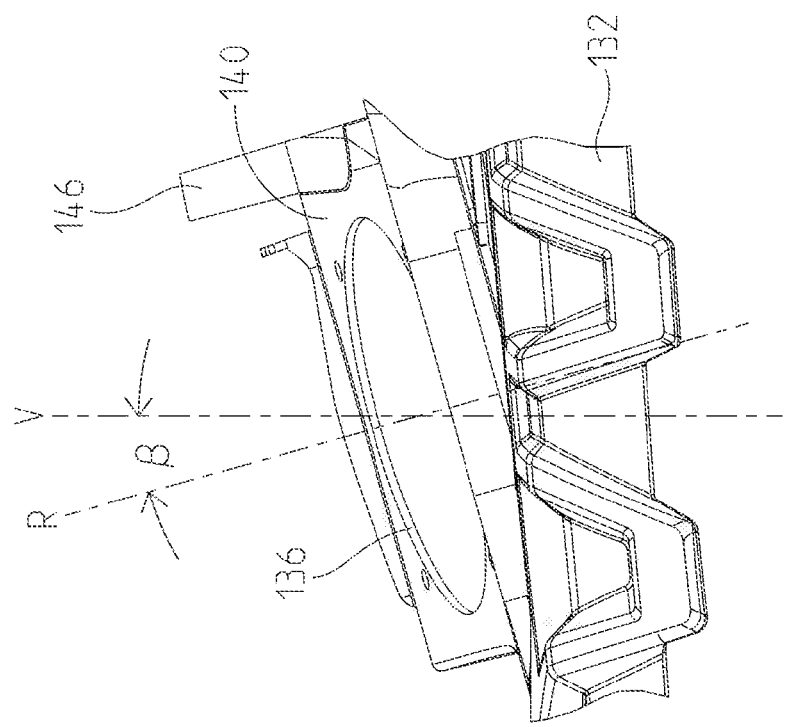
FIG. 19D is a side view of the portion of the support member of the lower hood assembly of FIG. 19C.
Figure 19C:
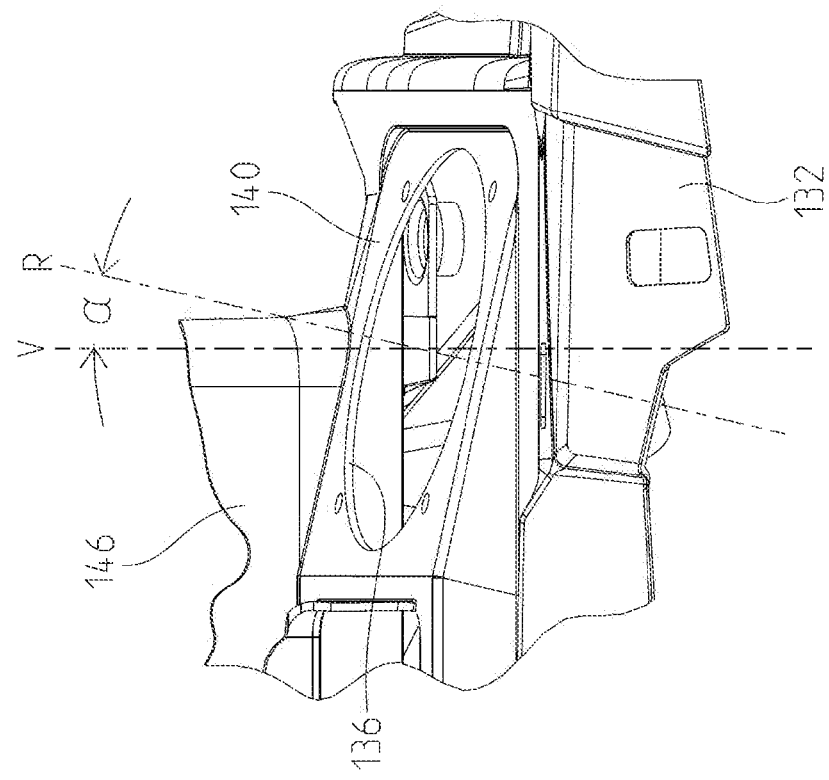
FIG. 19C is a front view of a portion of the support member of the lower hood assembly of FIG. 19A.
Figure 20:
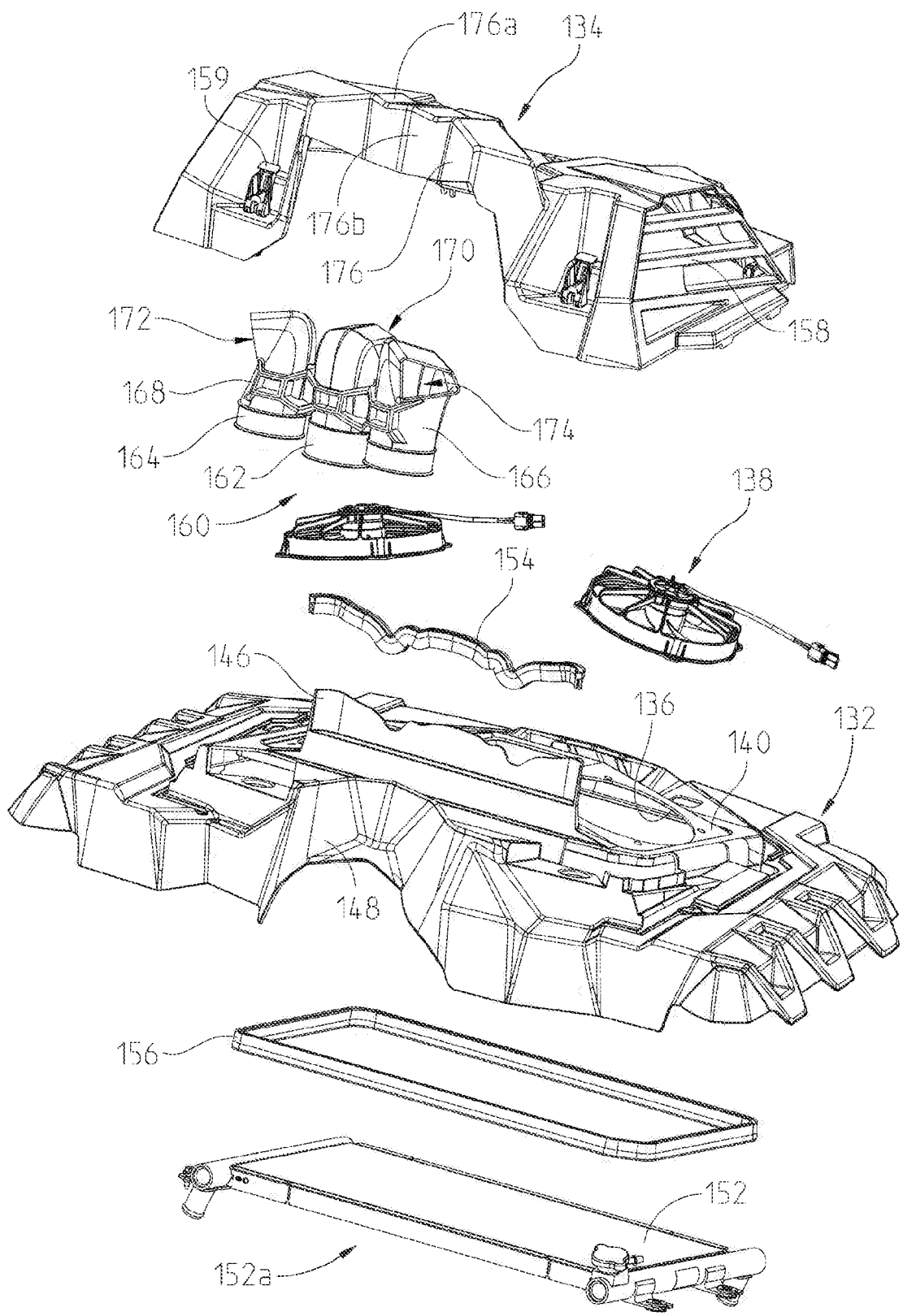
FIG. 20 is an exploded view of the hood assembly of FIG. 18 and the cooling assembly.
Figure 21A:
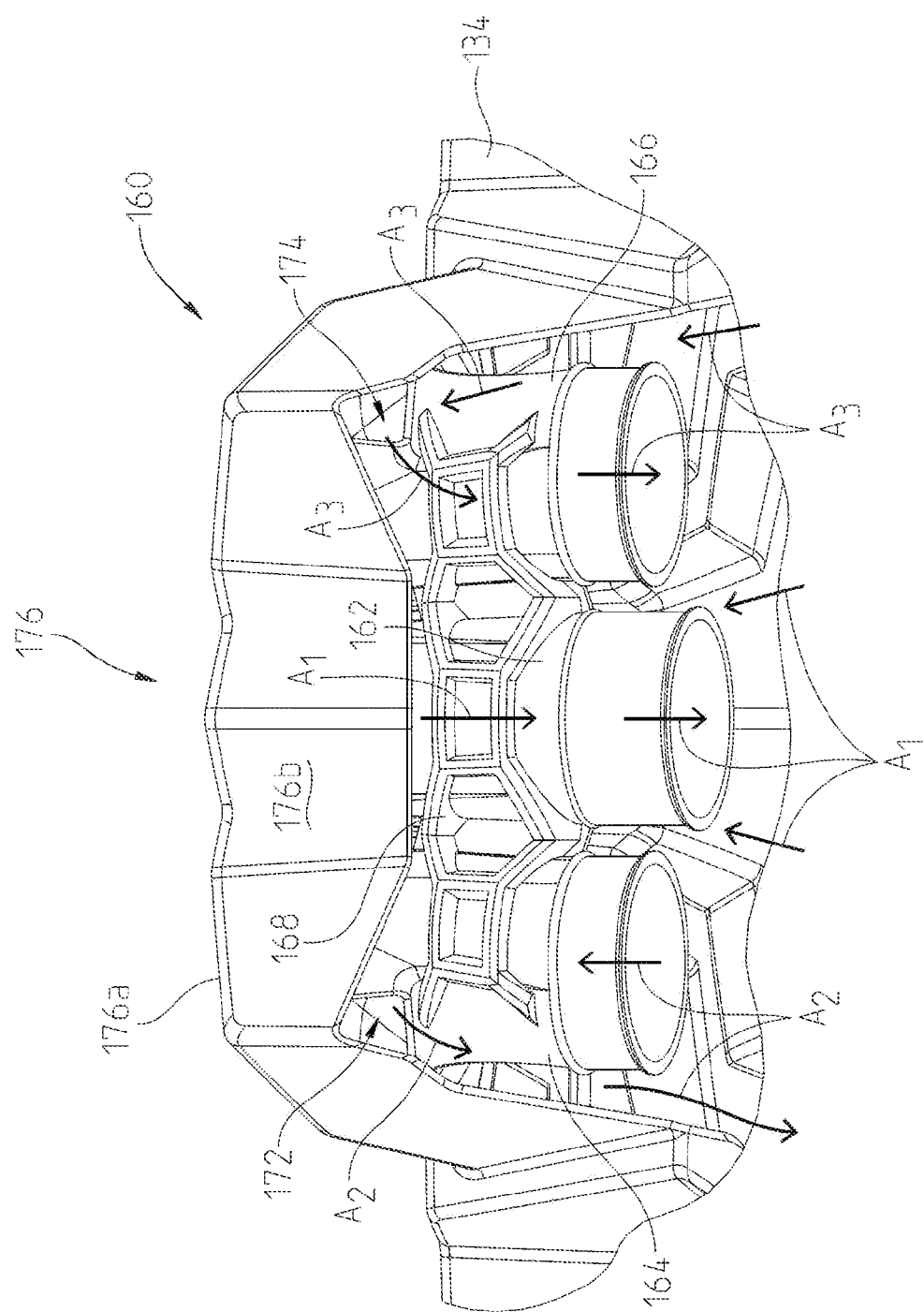
FIG. 21A is a rear view of the plurality of snorkels of FIG. 19B and an upper hood portion of the hood assembly of FIG. 18.
Figure 21B:
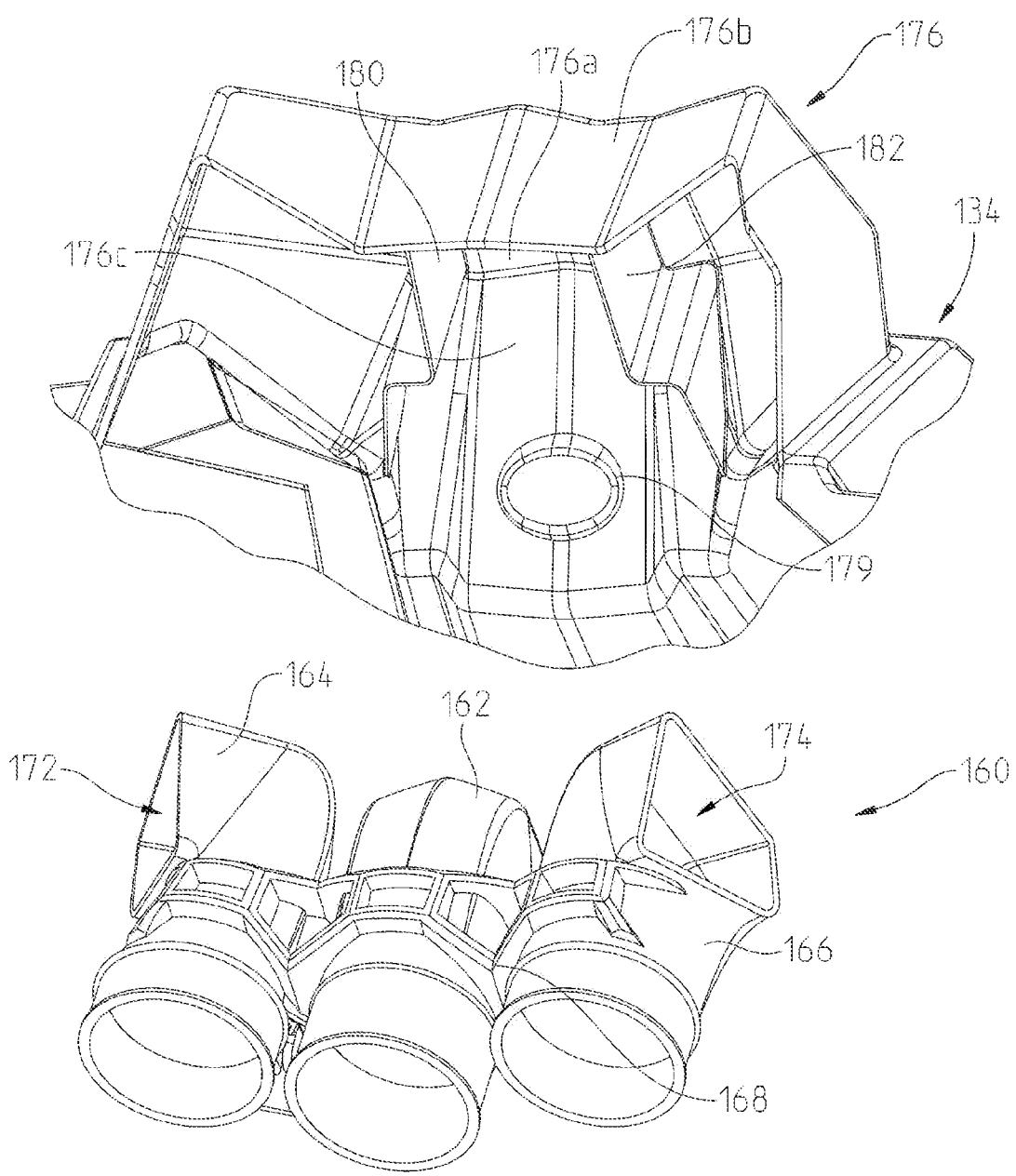
FIG. 21B is an exploded view of the snorkels and the upper hood portion of FIG. 21A.

Referring to FIGS. 19A-19D and 20, lower hood member 132 includes a surface 140 with openings 136 each configured to receive one of fans 138 of cooling assembly 130. In one embodiment, each fan 138 may have a diameter of approximately 5-10 inches, and illustratively, 7 inches. Fans 138 are coupled to surface 140 with fasteners 142 which are received through apertures 144 (FIGS. 19A, 19B). Surface 140 and, therefore, fans 138 are angled laterally away from longitudinal centerline $C_L$ and are angled downwardly in a forward direction, as shown in FIGS. 19C and 19D. More particularly, a rotation axis R of fan 138 is angled relative to a vertical axis V which intersects rotation axis R. For example, rotation axis R is angled relative to vertical axis V by an angle α of approximately 5-25°. In one embodiment, angle α between rotation axis R and vertical axis V is approximately 13°. As such, surface 140 and fan 138 may be angled laterally away from longitudinally centerline $C_L$ by approximately 13°. Additionally, surface 140 and fan 138 are angled downwardly in a forward direction by an angle β defined between rotation axis R and vertical axis V. In one embodiment, angle β is approximately 5-25° and, illustratively, angle β may be 16°. As such, surface 140 and fan 138 are angled downwardly relative to a horizontal plane intersecting longitudinal centerline $C_L$ by approximately 16°. In this way, surface 140 and fans 138 are positioned at a compound angle relative to vertical axis V which intersects rotation axis R of fan 138.

Figure 1:
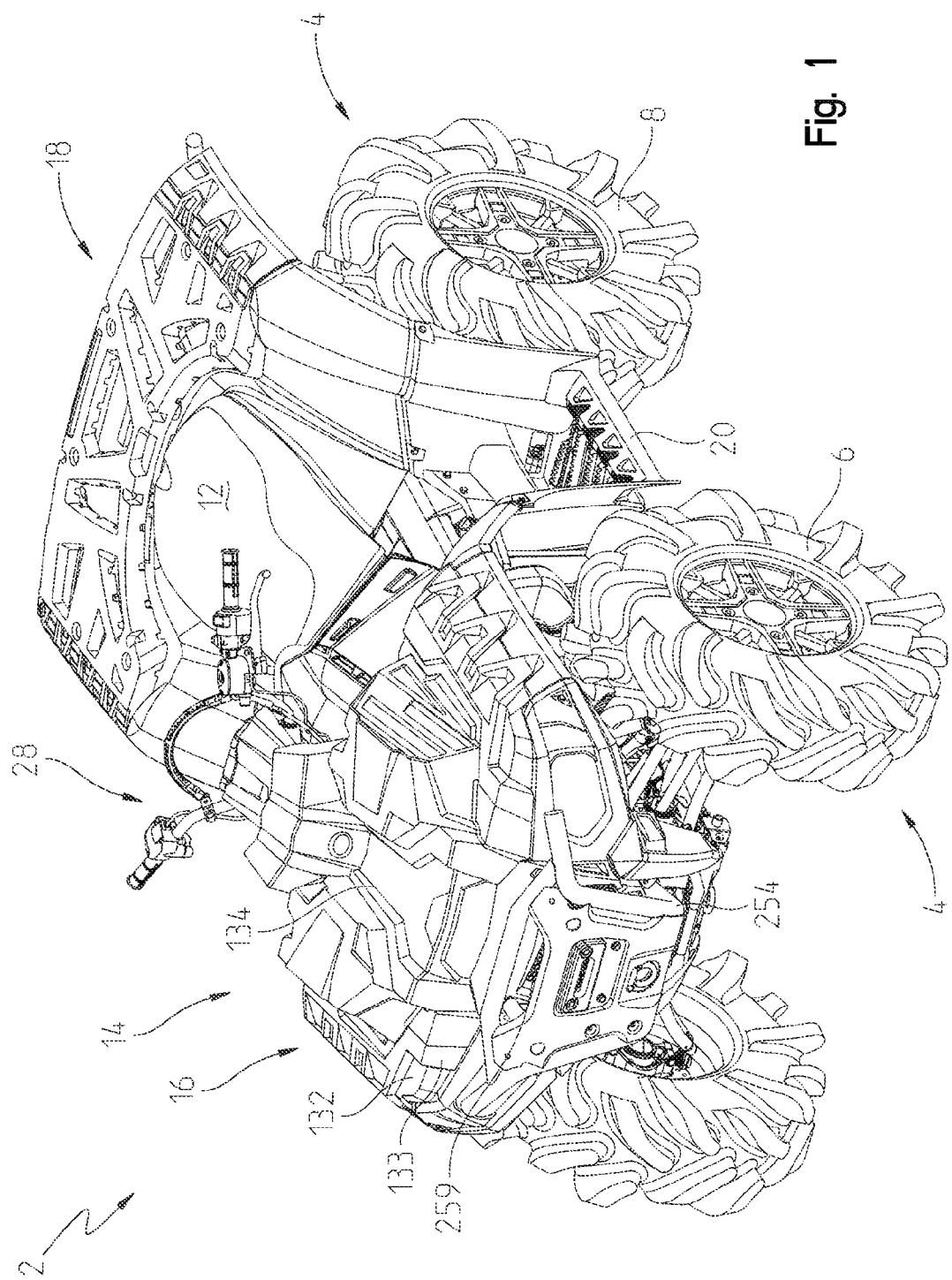
FIG. 1 is a left front perspective view of an all-terrain vehicle of the present disclosure.
Figure 2:
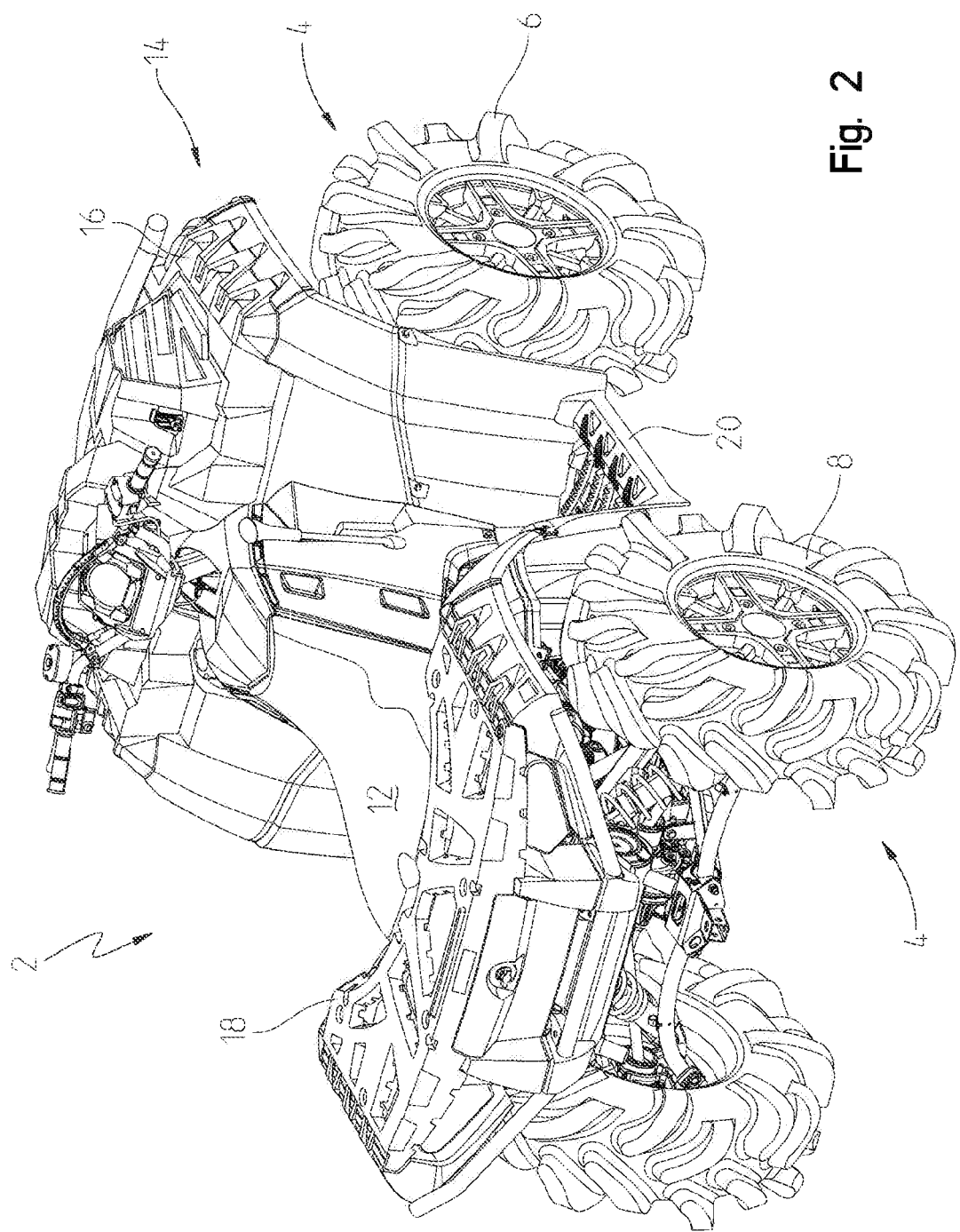
FIG. 2 is a right rear perspective view of the vehicle of FIG. 1.
Figure 3:
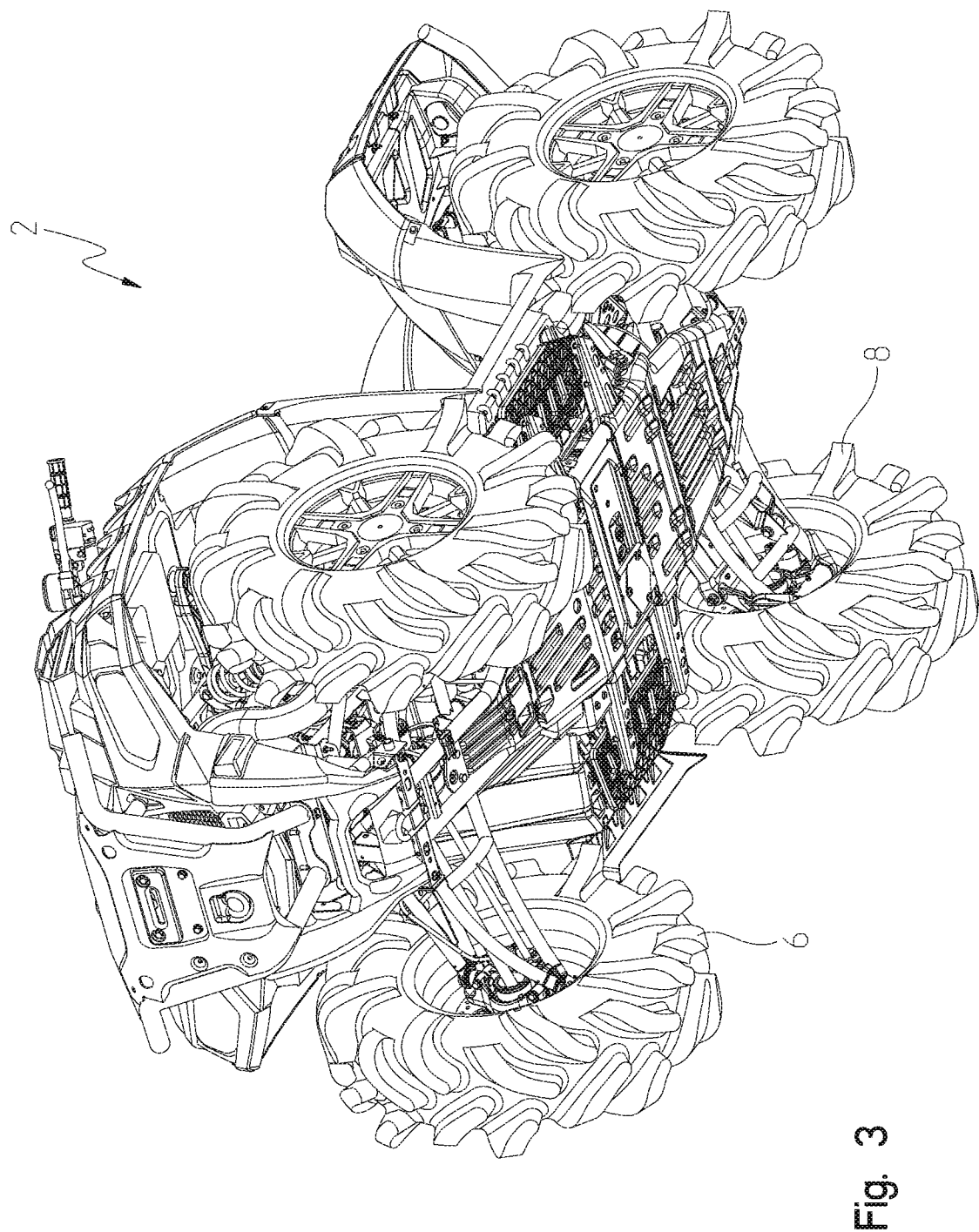
FIG. 3 is a left bottom perspective view of the vehicle of FIG. 1.

As shown in FIG. 20, fans 138 are positioned directly above radiator 152. Radiator 152 may be angled relative to a horizontal plane intersecting longitudinal centerline $C_L$ by an angle of 5-25° and, more particularly, 16°. In this way, mud, dirt, water, snow, and debris may slide off of radiator 152 rather than accumulate thereon if radiator 152 was positioned in a generally horizontal configuration. Additionally, a forward end 152a (FIG. 17) of radiator 152 is positioned rearward of a forwardmost surface 133 of lower hood member 132 (FIG. 19B). As shown in FIG. 1, forwardmost surface 133 of lower hood member 132 is positioned rearward of a front bumper or fender 254. As such, forward end 152a of radiator 152 is positioned rearward of front bumper 254. Radiator 152 is sealingly coupled to a lower surface of lower hood member 132 with a seal 156.

Radiator 152 is positioned below surface 140 and fans 138 are configured to draw air through radiator 152 from below vehicle 2 and from air flow through a front grill 259 (FIG. 1). Additionally, because battery 112 is positioned at the front end of vehicle 2 and below only the forward portion of radiator 152, the majority of radiator 152 is exposed which increases the unobstructed area of radiator 152 configured to receive air flow from below vehicle 2. More particularly, air from below radiator 152 and air flowing through front grill 259 flows through radiator 152 due to the rotation of fans 138 and is exhausted from fans 138 through a plurality of vents 158 in upper hood member 134.

Vents 158 are angled toward the side of vehicle 2 to prevent air drawn through fans 138 from being directed toward the operator. In one embodiment, one vent 158 generally faces laterally outward from longitudinal centerline $C_L$ toward a right side of vehicle 2 and the other vent 158 generally faces laterally outward from longitudinal centerline $C_L$ toward a left side of vehicle 2. In this way, air exhausted from cooling assembly 130 is directed away from the operator. Additionally, vents 158 direct hot air from cooling assembly 130 away from heat-sensitive components of vehicle 2, such as the fuel tank. In operation, the temperature of the cooling fluid for engine 24 is decreased when fans 138 rotate to draw air from below radiator 152 into radiator 152. The air cools the cooling fluid flowing through radiator 152 for cooling engine 24 and then the air flows from radiator 152, through fans 138, and leaves vehicle 2 through vents 158. In one embodiment, fans 138 operate continuously during operation of vehicle 2 to provide a constant air flow through radiator 152. Alternatively, cooling assembly 130 includes a thermostat (not shown) for operating fans 138 intermittently based on the temperature of the cooling fluid within radiator 152. As such, when fans 138 are not operating, air flows through radiator 152 as ambient air flows past radiator 152 during movement of vehicle 2.

Referring still to FIG. 20, lower hood member 132 also includes a partition 146 positioned rearward of surface 140 and openings 136. Partition 146 is sealed from upper hood member 134 by a seal 154. Partition 146 cooperates with a rear wall 148 of lower hood member 132 to define an opening 150 for receiving a plurality of snorkels or air openings 160. In one embodiment, snorkels 160 are defined by rubber or other polymeric boots and are configured for air flow therethrough. Snorkels 160 are positioned within a rearward portion 176 of upper hood member 134 such that an upper wall 176a of rearward portion 176 is positioned above snorkels 160 and a rear wall 176b of rearward portion 176 is positioned rearward of snorkels 160. A front wall 176c of rearward portion 176 may include a recess 179 for affixing a logo or other identifying information to hood assembly 16 of vehicle 2.

Snorkels 160 may be joined together through a coupling member 168. Snorkels 160 extend vertically above lower hood member 132 and through opening 150. Because upper hood member 134 is removably coupled to lower hood member 132 with hinges 159, snorkels 160 may be easily accessed for cleaning, repair, etc.

Figure 4:
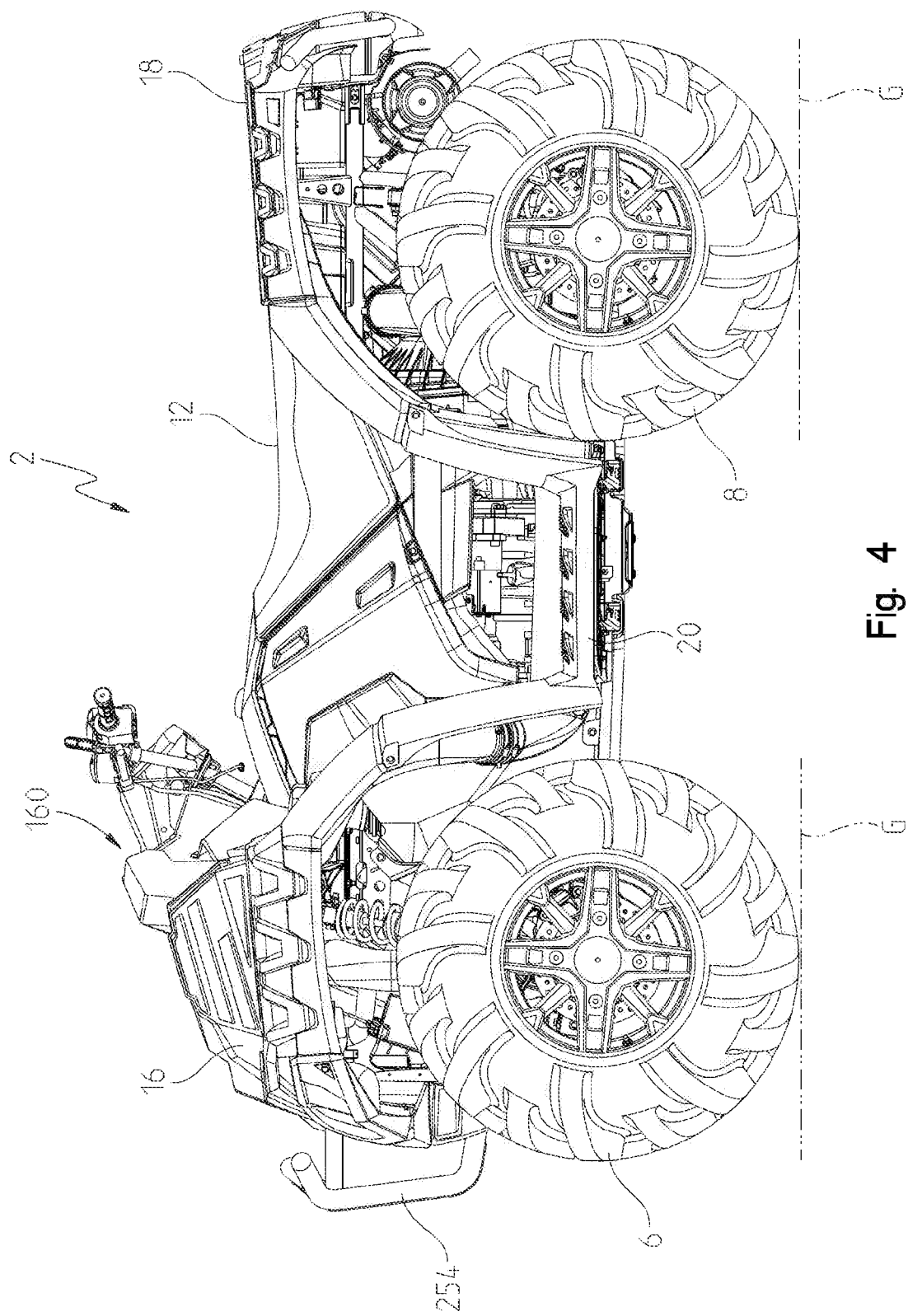
FIG. 4 is a left side view of the vehicle of FIG. 1.
Figure 5:
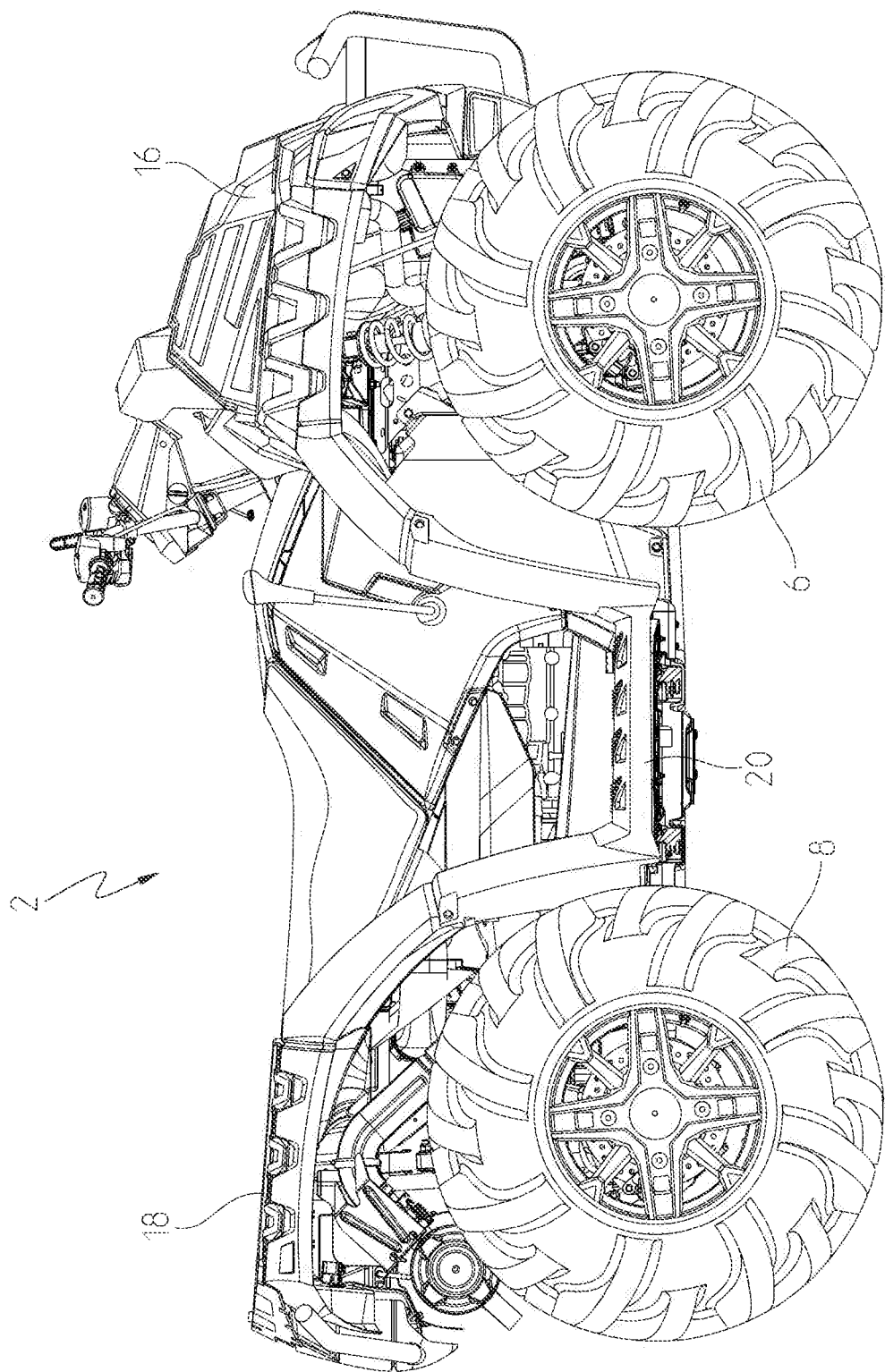
FIG. 5 is a right side view of the vehicle of FIG. 1.
Figure 25:
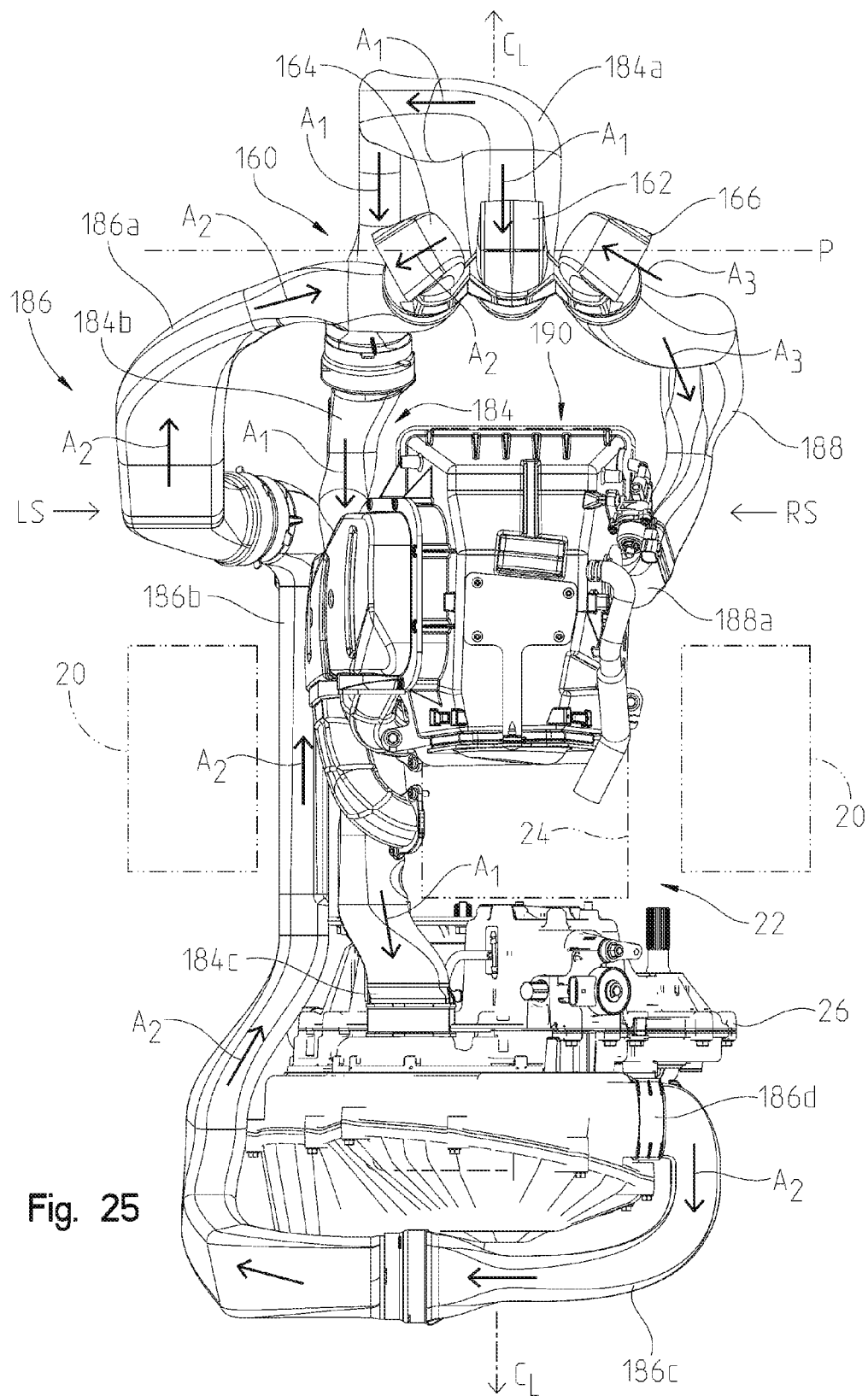
FIG. 25 is a top view of the snorkels and fluid conduits of FIG. 24 and an airbox and a continuously variable transmission of a powertrain assembly of the vehicle of FIG. 1.

In one embodiment, snorkels 160 are positioned at a vertical distance greater than that of seat 12 and are positioned forward of forward end 12a or seat 12. Additionally, snorkels 160 are positioned forward of a portion of steering assembly 28, such as handlebars 282, and are laterally inward from footwells (FIG. 25). Additionally, snorkels 160 are positioned rearward of fans 138 and a rear end 152b (FIG. 17) of radiator 152, as shown in FIGS. 19B and 20. Illustratively, snorkels 160 are positioned above ground surface G by approximately 40-60 inches. For example, snorkels 160 may be approximately 48 inches above ground G. In one embodiment, snorkels 160 are positioned at a greater vertical distance from ground G than the upper surface of front bumper 254 (FIG. 4). Snorkels 160 may be supported on lower hood member 132 with conventional couplers (e.g., clamps, bolts, rivets, welds, etc.).

Referring to FIGS. 21A-23, snorkels 160 include a cooling air inlet 162 for CVT 26 to provide cooling air to CVT 26, a cooling air outlet 164 for CVT 26 to expel hot air from CVT 26 from vehicle 2, and a combustion air inlet 166 for engine 24 to provide combustion air to engine 24. Cooling air inlet 162, cooling air outlet 164, and combustion air inlet 166 are generally positioned in a laterally-extending orientation. More particularly, a plane P extending from a right side RS to a left side LS of vehicle 2 which is generally perpendicular to longitudinal centerline $C_L$ intersects cooling air inlet 162, cooling air outlet 164, and combustion air inlet 166, as shown in FIG. 25.

Cooling air inlet 162 is positioned along longitudinal centerline $C_L$ and includes an opening 170 which faces in a forward direction for receiving an air flow $A_1$ for cooling CVT 26. As air flows into cooling air inlet 162, air flows in a direction parallel to longitudinal centerline $C_L$. Cooling air outlet 164 is positioned laterally adjacent cooling air inlet 162 and longitudinal centerline $C_L$ and includes an opening 172 which is angled relative to cooling air inlet 162. In one embodiment, opening 172 generally faces a left side of vehicle 2 to receive an air flow $A_2$ from CVT 26 to prevent hot air exhausted from CVT 26 from being directed toward the operator. Similarly, combustion air inlet 166 is positioned laterally adjacent cooling air inlet 162 and longitudinal centerline $C_L$ and includes an opening 174 which is angled relative to cooling air inlet 162. In one embodiment, opening 174 generally faces a right side of vehicle 2 to draw in an air flow $A_3$ into engine 24 for combustion therein. By positioning snorkels 160 in proximity to longitudinal centerline $C_L$, air flow through snorkels 160 is not affected by vehicle 2 tilting during operation thereof. Additionally, the location of snorkels 160 is furthest from any conditions on ground G, such as mud, water, snow, dirt, and debris, thereby decreasing the likelihood that snorkels 160 will become clogged during operation of vehicle 2.

To decrease the likelihood of cooling air inlet 162, cooling air outlet 164, and combustion air inlet 166 scavenging air from each other during operation of vehicle 2, rearward portion 176 includes a plurality of baffles for separating openings 170, 172, 174 within rearward portion 176. More particularly, a first baffle 180 separates opening 170 from opening 172 such that the hot air flowing from cooling air outlet 164 is not drawn into cooling air inlet 162. Additionally, a second baffle 182 separates opening 170 from opening 174 such that cooling air inlet 162 does not scavenge air from combustion air inlet 166 or vice versa. Therefore, both engine 24 and CVT 26 receive sufficient quantities of air for combustion and cooling, respectively.

Figure 23:
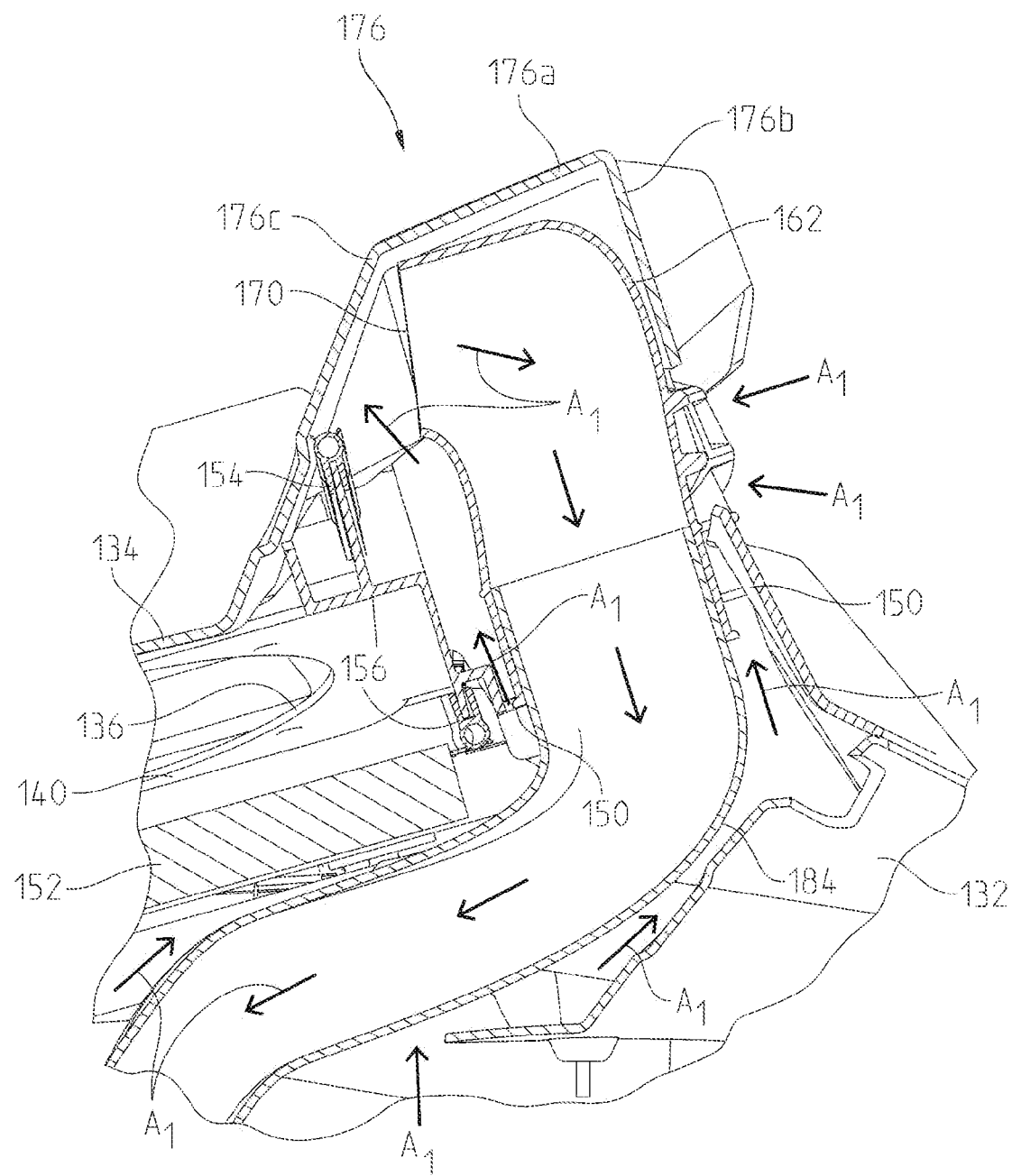
FIG. 23 is a cross-sectional view of air flow through one of the snorkels of FIG. 21B.
Figure 24:
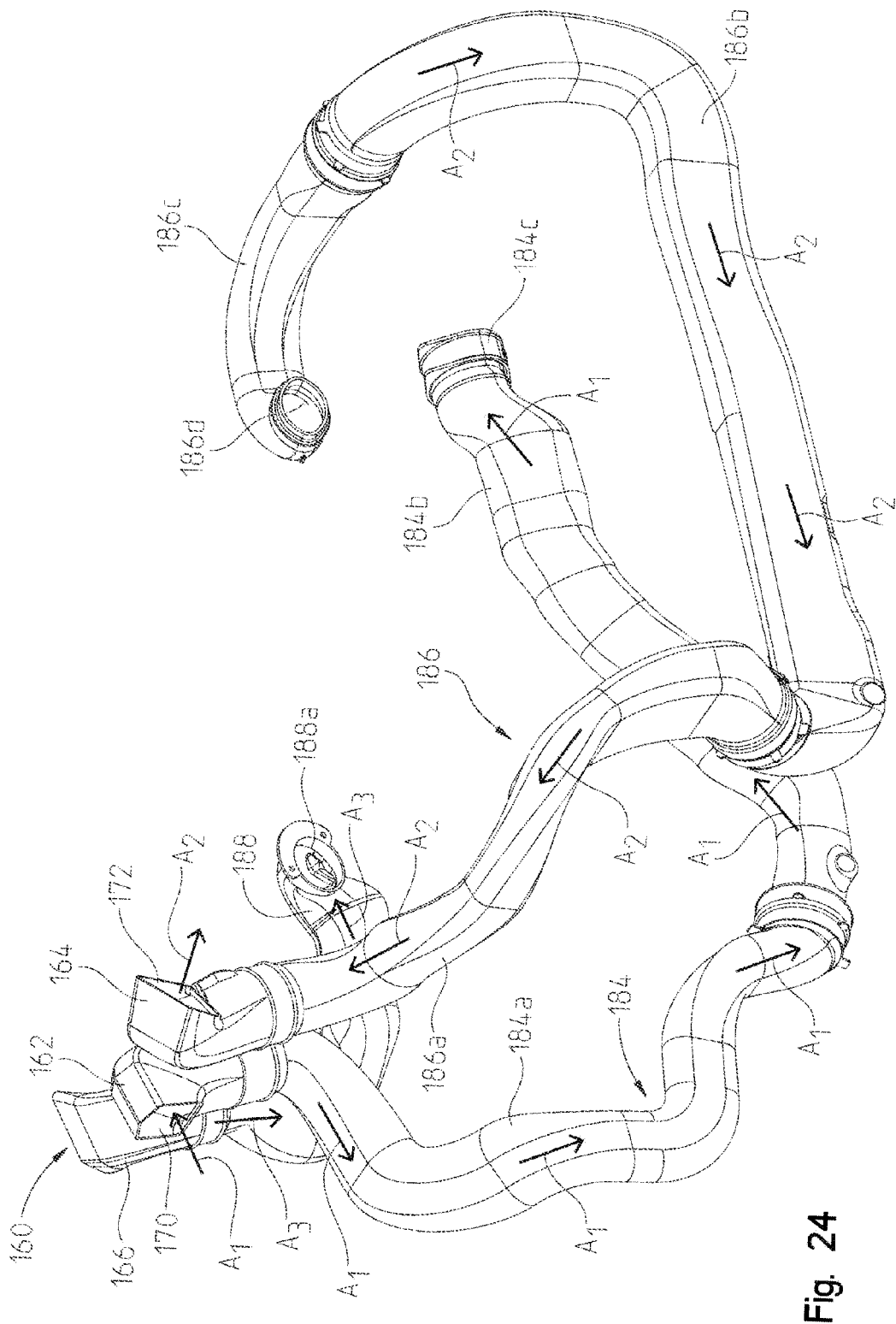
FIG. 24 is a left front perspective view of the snorkels of FIG. 21B each fluidly coupled to a fluid conduit.

As shown in FIGS. 23-25, snorkels 160 are coupled to a plurality of conduits 184, 186, 188 for flowing air therethrough. Conduits 184, 186, 188 may be comprised of a polymeric material and may be formed through a blow molding process. As shown in FIG. 25, conduits 184, 186, 188 are positioned generally inward of footwells 20 and may extend in both vertical and longitudinal directions.

More particularly, cooling air inlet 162 is coupled to a conduit 184 for receiving air flow $A_1$ through opening 170 and directing it toward CVT 26 to cool CVT 26. Conduit 184 may be a singular component or may be comprised of a plurality of components, such as a first conduit component 184a and a second conduit component 184b. As shown in FIG. 24, first conduit component 184a extends downwardly in a generally vertical direction and second conduit component 184b extends rearwardly in a generally longitudinal direction. An output end 184c of conduit 184 is fluidly coupled to an inlet of CVT 26. By positioning battery 112 at the front end of vehicle 2, conduit 184 is configured to extend along a left side of engine 24. As shown in FIGS. 22 and 23, cooling air flow $A_1$ flows into opening 170 from below vehicle 2 due to the rotation of fans 138 drawing air through radiator 152. In particular, the cooling air flow $A_1$ flows through a portion of lower hood member 132, through opening 150, and into upper hood member 134 before flowing into opening 170, through conduit 184, and into CVT 26.

Similarly, and referring to FIGS. 24 and 25, cooling air outlet 164 is coupled to a conduit 186 for flowing air flow $A_2$ from CVT 26 toward opening 172 to expel hot air from CVT 26. Conduit 186 may be a singular component or may be comprised of a plurality of components, such as a first conduit component 186a, a second conduit component 186b, and a third conduit component 186c. As shown in FIG. 24, first conduit component 186a extends downwardly in a generally vertical direction, second conduit component 186b extends rearwardly in a generally longitudinal direction, and third conduit component 186c extends laterally in a direction generally perpendicular to longitudinal centerline $C_L$. An intake end 186d of conduit 186 is fluidly coupled to an output port of CVT 26. By positioning battery 112 at the front end of vehicle 2, conduit 186 is configured to extend along a left side of engine 24 and a rear side of CVT 26.

Additionally, and still referring to FIGS. 24 and 25, combustion air inlet 166 is coupled to a conduit 188 for flowing air flow $A_3$ from opening 174 and toward engine 24 to provide air to the combustion chamber (not shown) of engine 24 for combustion therein. Conduit 188 may be a singular component or may be comprised of a plurality of components. In one embodiment, conduit 188 extends downwardly from combustion air inlet 166 and extends rearwardly toward engine 24.

As shown in FIG. 25, an output end 188a of conduit 188 is fluidly coupled to an airbox assembly 190 of engine 24. Airbox assembly 190 filters air flow $A_3$ before the air enters throttle bodies 212 of engine 24 for combustion therein. Throttle bodies 212 are supported on airbox assembly 190 with a support member 210 coupled to airbox assembly 190. Throttle bodies 212 are configured to supply combustion air to engine 24 through engine intakes 214.

Figure 26:
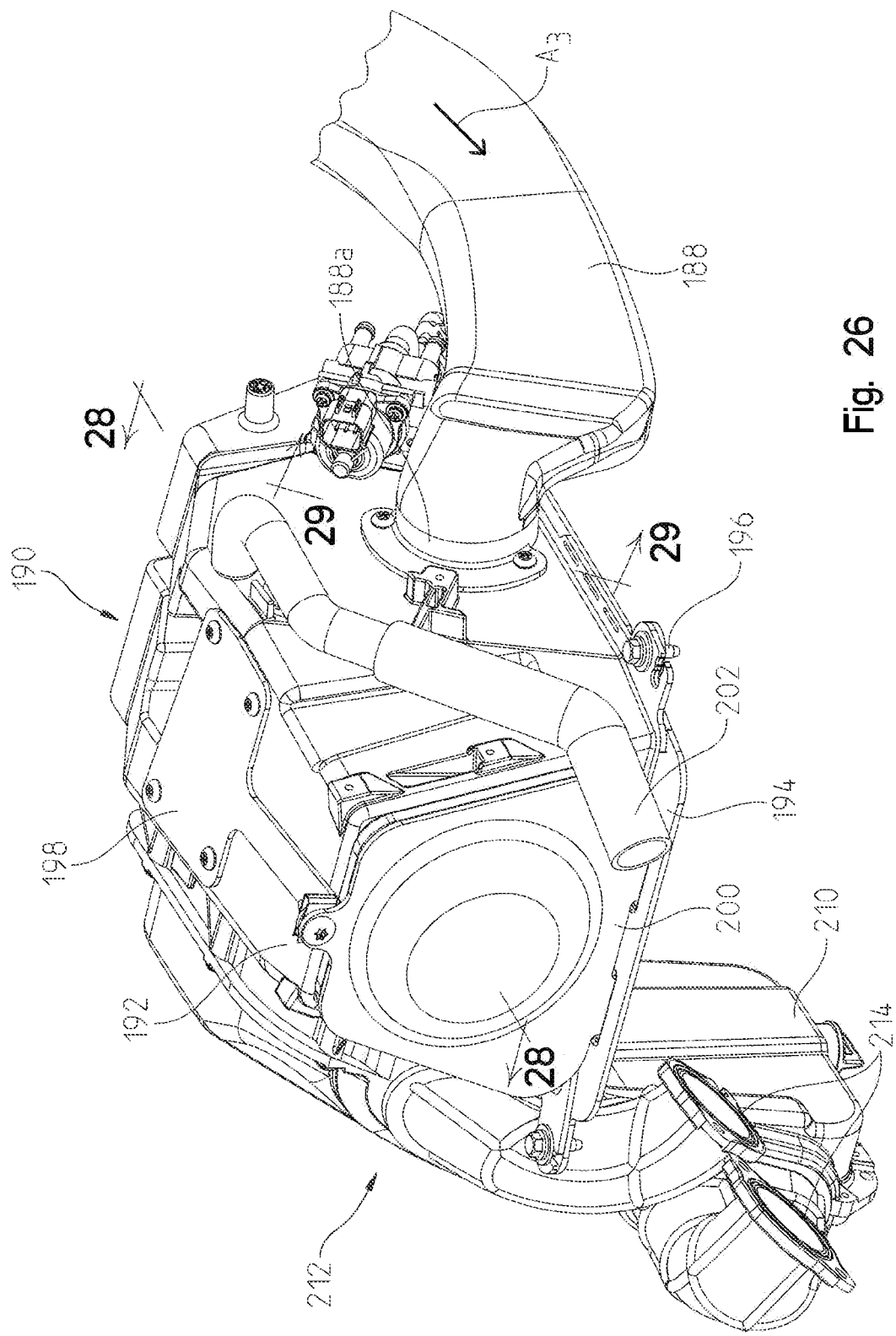
FIG. 26 is a right rear perspective view of the airbox assembly of FIG. 24.
Figure 27:
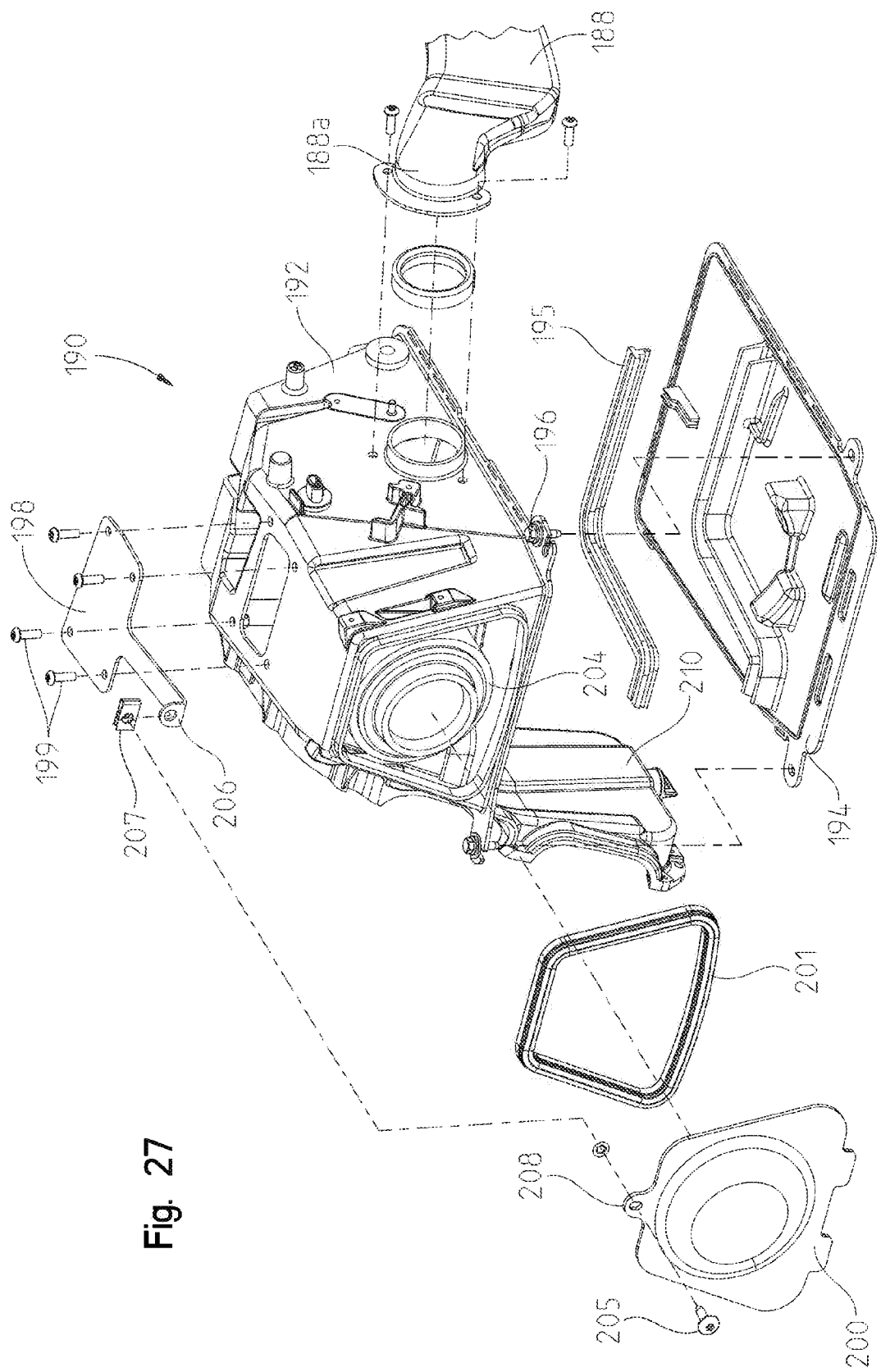
FIG. 27 is an exploded view of the airbox assembly of FIG. 26.

Airbox assembly 190 includes a housing 192, a support plate 194 sealingly coupled to a bottom surface of housing 192 with fasteners 196, a seal 195 positioned intermediate support plate 194 and housing 192, a delete plate 198 coupled to an upper surface of housing 192 with fasteners 199, a panel or door 200 sealingly coupled to a rear surface of housing 192 with a seal 201, a breather tube 202 fluidly coupled to the internal volume of housing 192, and a filter 204 positioned within the internal volume of housing 192 for filtering air flow $A_3$ from conduit 188. Delete plate 198 may be coupled to plate 200 with a fastener 205. For example, as shown in FIGS. 26 and 27, delete plate 198 may include a vertically-extending tab 206 which is coupled to an upper tab 208 of plate 200 with a coupler 207 and fastener 205. In one embodiment, plate 200 is comprised of 10-gauge steel to increase the torsional stability of airbox assembly 190 during operation of vehicle 2. More particularly, during operation of vehicle 2, airbox assembly 190 may experience torsional or other stresses as vehicle 2 moves along ground G and over objects and as engine 24 operates; however, plate 200 provides structural rigidity to housing 192 to decrease any stresses applied to airbox assembly 190.

Figure 28:
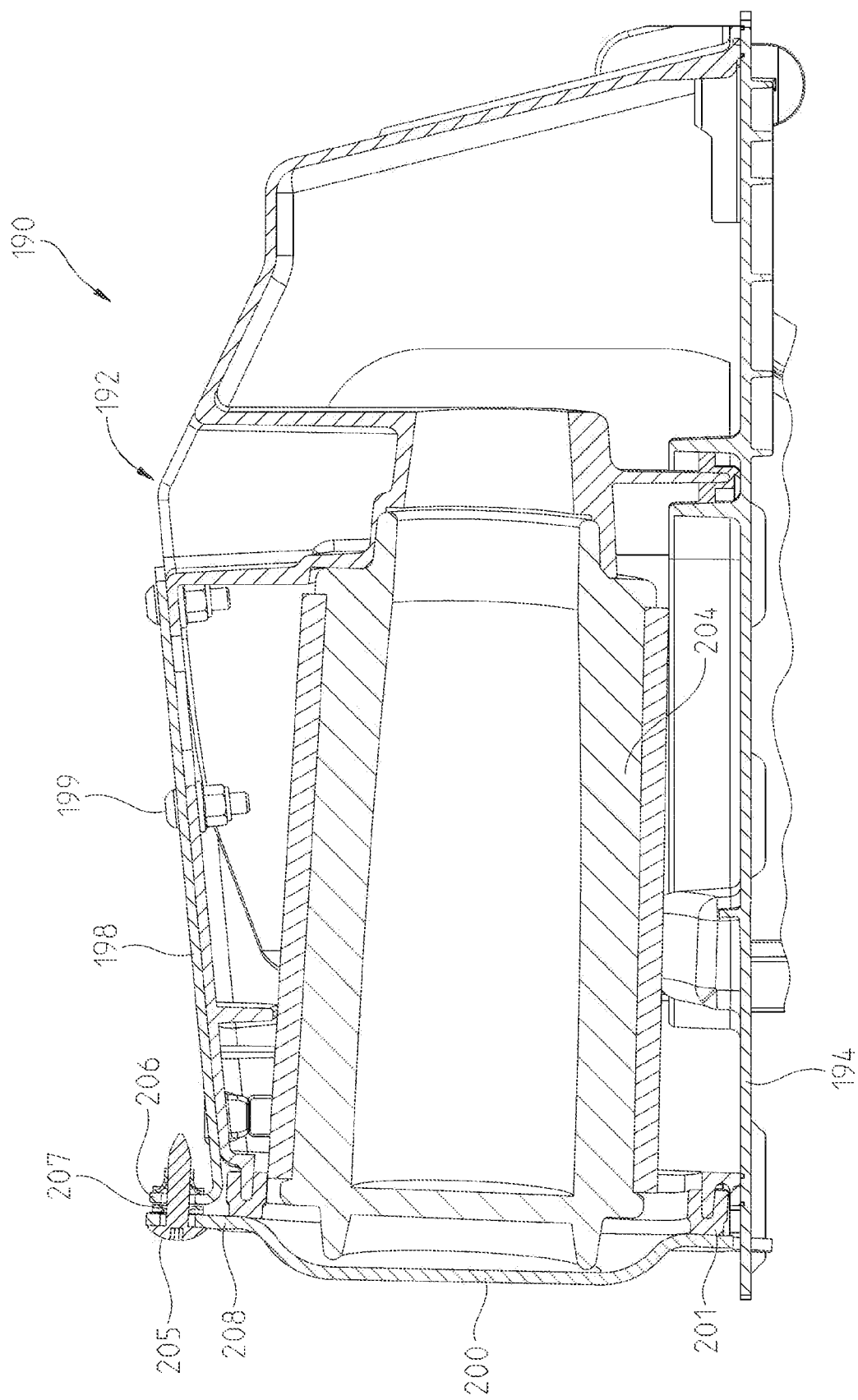
FIG. 28 is a cross-sectional view of a portion of the airbox assembly of FIG. 26, taken along line 28-28 of FIG. 26.
Figure 29:
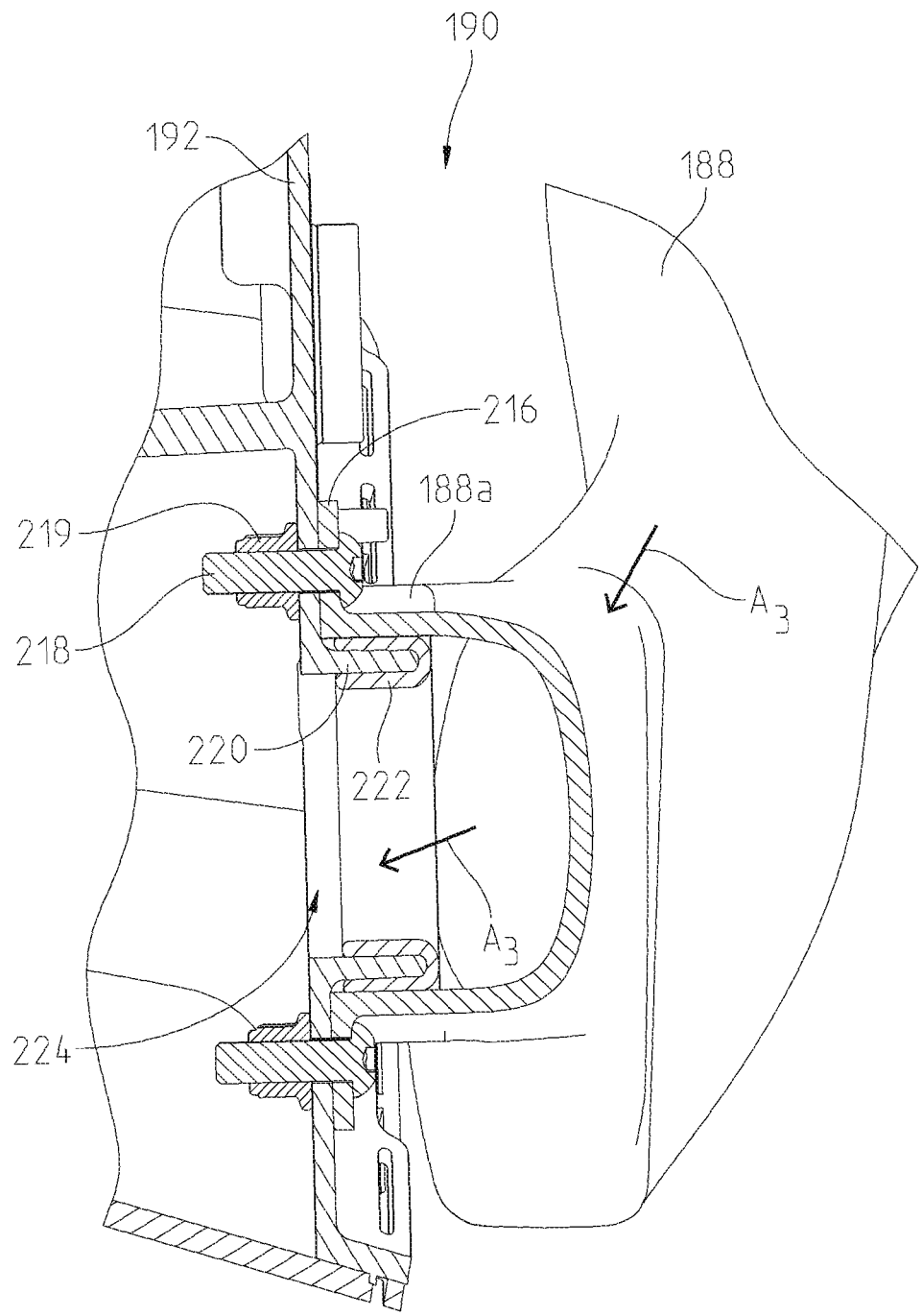
FIG. 29 is a cross-sectional view of a portion of the airbox assembly of FIG. 26, taken along line 29-29 of FIG. 26.

Referring to FIGS. 28 and 29, to flow air from combustion air inlet 166 into engine 24, conduit 188 is coupled to a right side of housing 192 of airbox assembly 190. More particularly, output end 188a of conduit 188 includes a flange 216 which abuts housing 192 and coupled thereto with fasteners 218, 219. Additionally, a tab 220 of housing 192 extends laterally into output end 188a and sealingly engages output end 188a through a seal 222 positioned around tab 220. As such, ambient air flows into combustion air inlet 166, through conduit 188, through output end 188a of conduit 188, and into housing 192 of airbox assembly 190 through an opening 224 in the right side of housing 192. The ambient air is then filtered by filter 204 within housing 192 and flows into throttle bodies 212 before flowing into a combustion chamber within engine 24.

Referring to FIGS. 30-33, footwells 20 of vehicle 2 are shown. Footwells 20 extend between a front upstanding body member 226 and a rear upstanding body member 228 of body panels 14. Footwells 20 may be integrally formed with body members 226, 228 or may be coupled thereto through conventional coupling means (e.g., overmolding, welding, mechanical fasteners, adhesive, etc.). As such, footwells 20 may be comprised of a polymeric or composite material similar to that of body panels 14 and may be formed through a molding process. Footwells 20 are positioned laterally outward of and below seat 12 and are configured to support the operator's feet when operating vehicle 2.

Referring still to FIGS. 30-33, footwells 20 include an outer portion 230 and an inner portion 232 which is recessed relative to outer portion 230. As such, outer portion 230 maintains the operator's foot within inner portion 232. In one embodiment, footwells 20 may be supported by braces 40 (FIGS. 9 and 10). Additionally, a support plate 244 may be positioned below inner portion 232 to add rigidity to inner portion 232. Support plate 244 and inner portion 232 may be coupled together with fasteners 246, 248. Support plate 244 includes a plurality of apertures 250, as disclosed further herein.

As shown in FIGS. 30-33, both outer and inner portions 230, 232 include a plurality of through apertures extending entirely from an upper surface to a lower surface of outer and inner portions 230, 232. More particularly, outer portion 230 includes apertures 234 which may have a generally triangular shape and inner portion 232 includes apertures 236 which may have a generally rectangular shape. However, apertures 234, 236 may be configured with any shape or profile. Apertures 236 of inner portion 232 are generally aligned with apertures 250 of support plate 244. Apertures 234, 236, 250 allow mud, dirt, snow, water, or other matter to fall through footwells 20 to prevent a buildup or accumulation on footwells 20 which may affect the grip of the operator's shoe on footwells 20. Outer and inner portions 230, 232 also include tread or grip members 238, 240, respectively. Tread members 238, 240 are raised relative to apertures 234, 236, respectively, and provide traction for the operator's shoe when supported by footwells 20.

Referring to FIGS. 30-33, in addition to including apertures 234, 236, 250 to prevent accumulation of mud, water, dirt, snow, or other matter on footwells 20, rear upstanding body member 228 also includes an opening 242 with a generally rectangular shape. Alternative shapes or profiles of opening 242 are possible. Opening 242 is provided rearward of apertures 234, 236, 250 and allows mud, water, dirt, snow, or other matter to slide rearwardly along inner portion 232 and off of vehicle 2 through opening 242. However, front upstanding body member 225 does not include an opening because mud or other debris may enter footwells 20 through such an opening.

Figure 30:
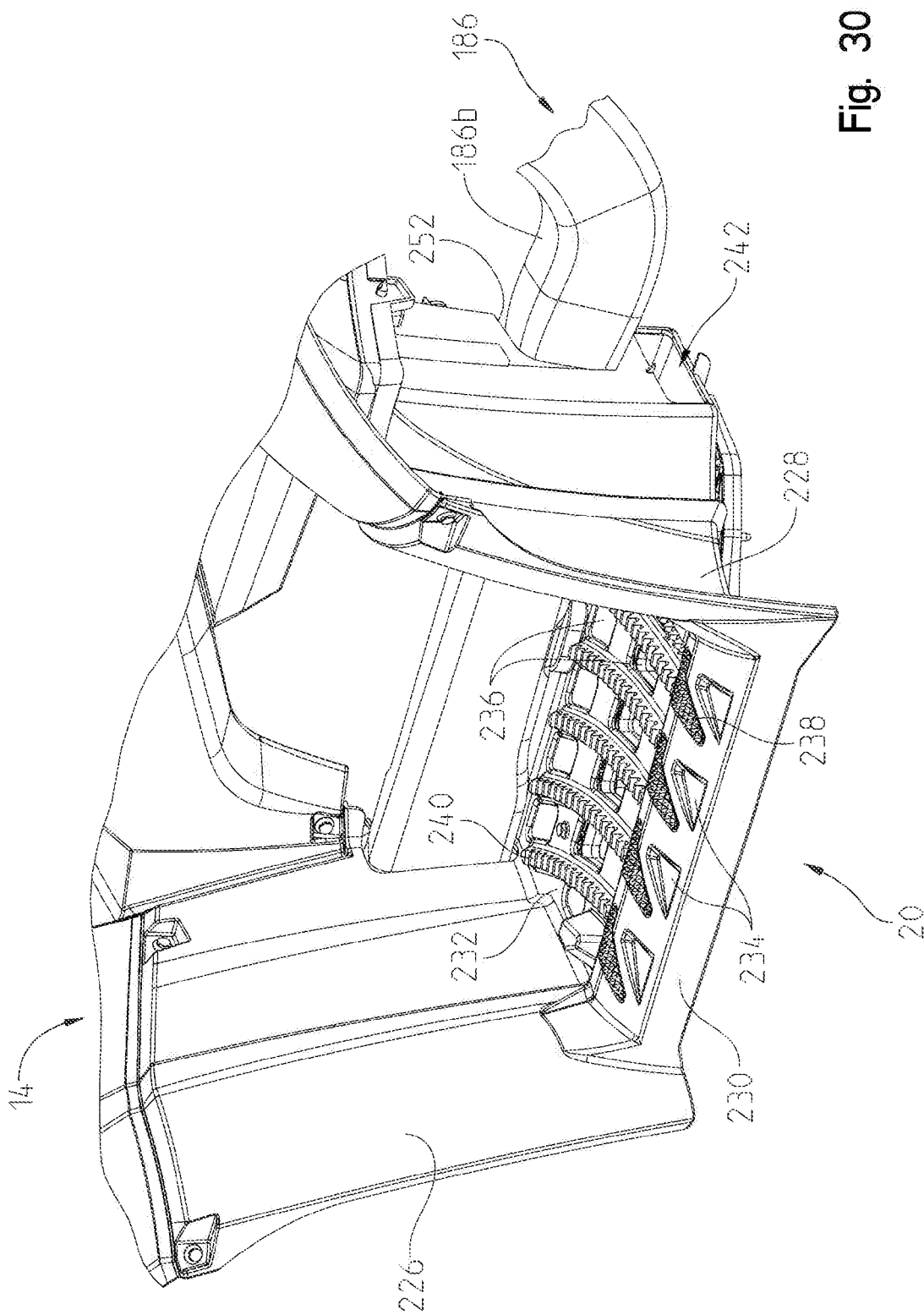
FIG. 30 is a left rear perspective view of a footwell of the vehicle of FIG. 1.
Figure 31:
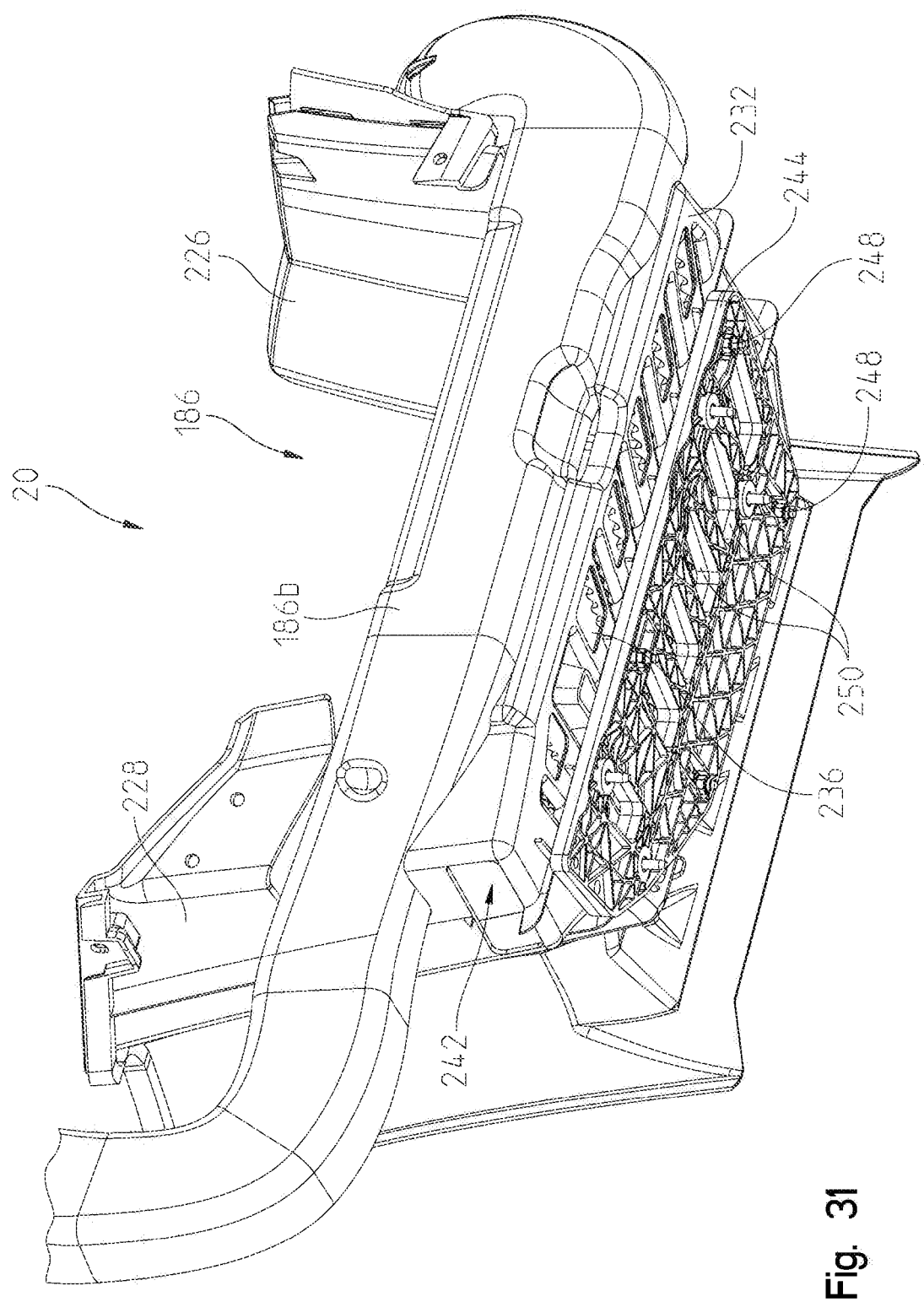
FIG. 31 is a right rear perspective view of an underside of the footwell of FIG. 30.
Figure 32:
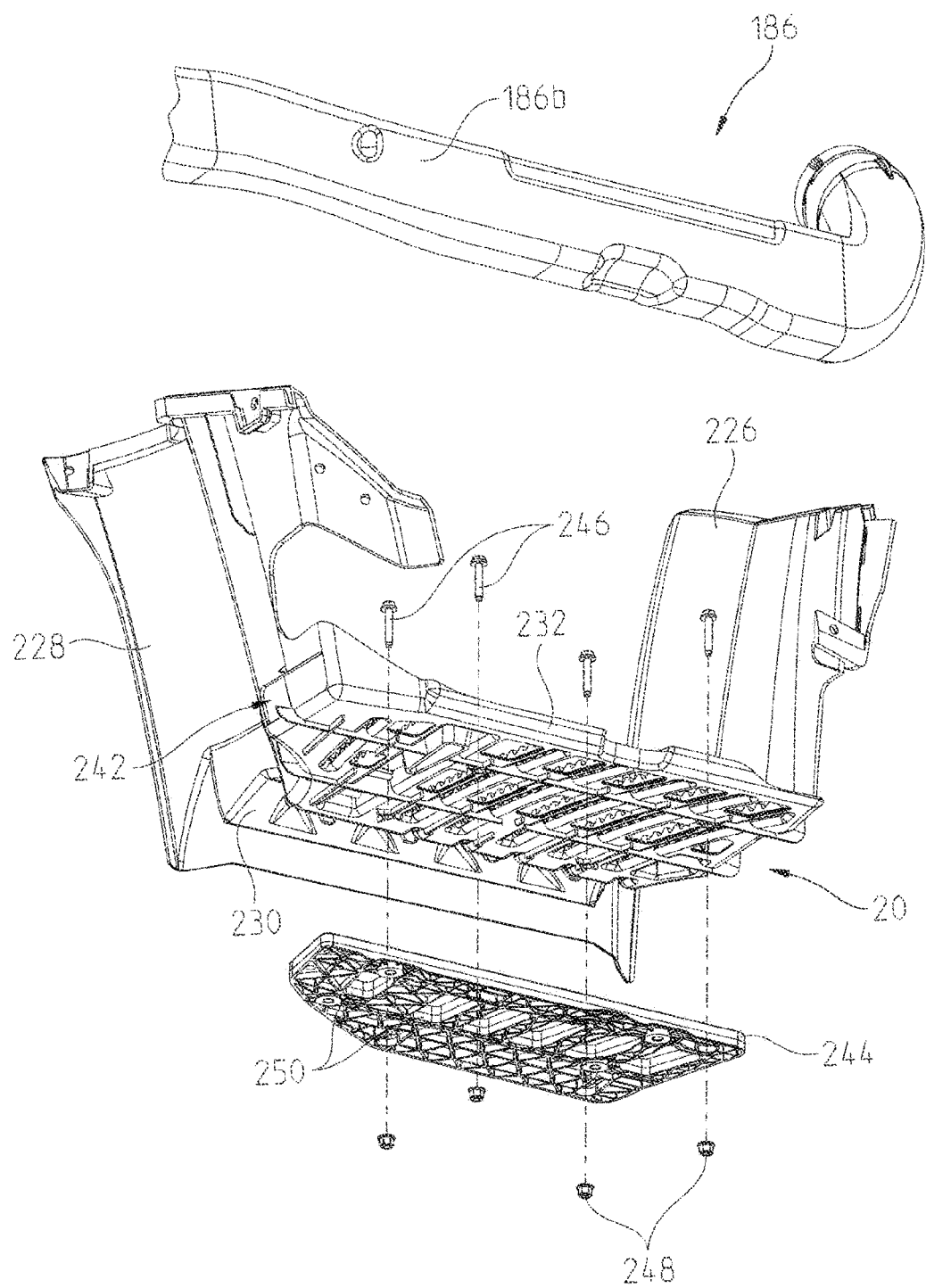
FIG. 32 is an exploded view of the footwell of FIG. 30.
Figure 33:
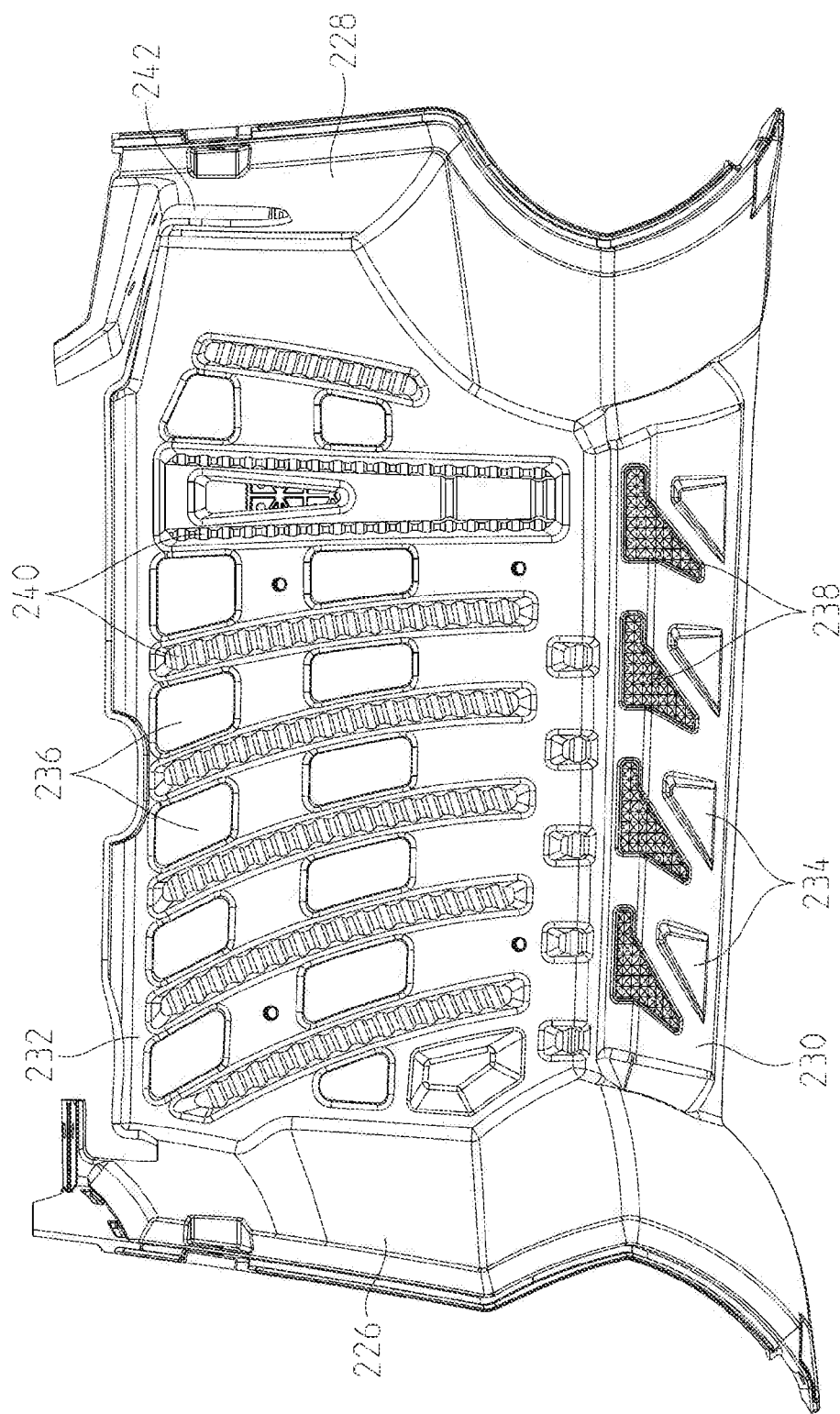
FIG. 33 is a top view of the footwell of FIG. 30.

As shown in FIGS. 30-32, rear upstanding body member 228 also includes a cut-out 252 for receiving second conduit component 186*b* of conduit 186 which delivers hot air from CVT 26 to cooling air outlet 164. More particularly, as shown in FIG. 24, conduit 186 extends vertically downward from cooling air outlet 164 and extends rearwardly in a longitudinal direction toward CVT 26. Therefore, second conduit component 186*b* is positioned adjacent footwell 20, and in particular, adjacent inner portion 232 of footwell 20. Because of cut-out 252, conduit component 186*b* may be positioned in close proximity to footwell 20 which allows for proper air flow from CVT 26 while maintaining the width of vehicle 2. Additionally, as shown in FIG. 25, conduits 184, 186, 188 and snorkels 160 are positioned laterally inward of footwells 20.

Figure 34:
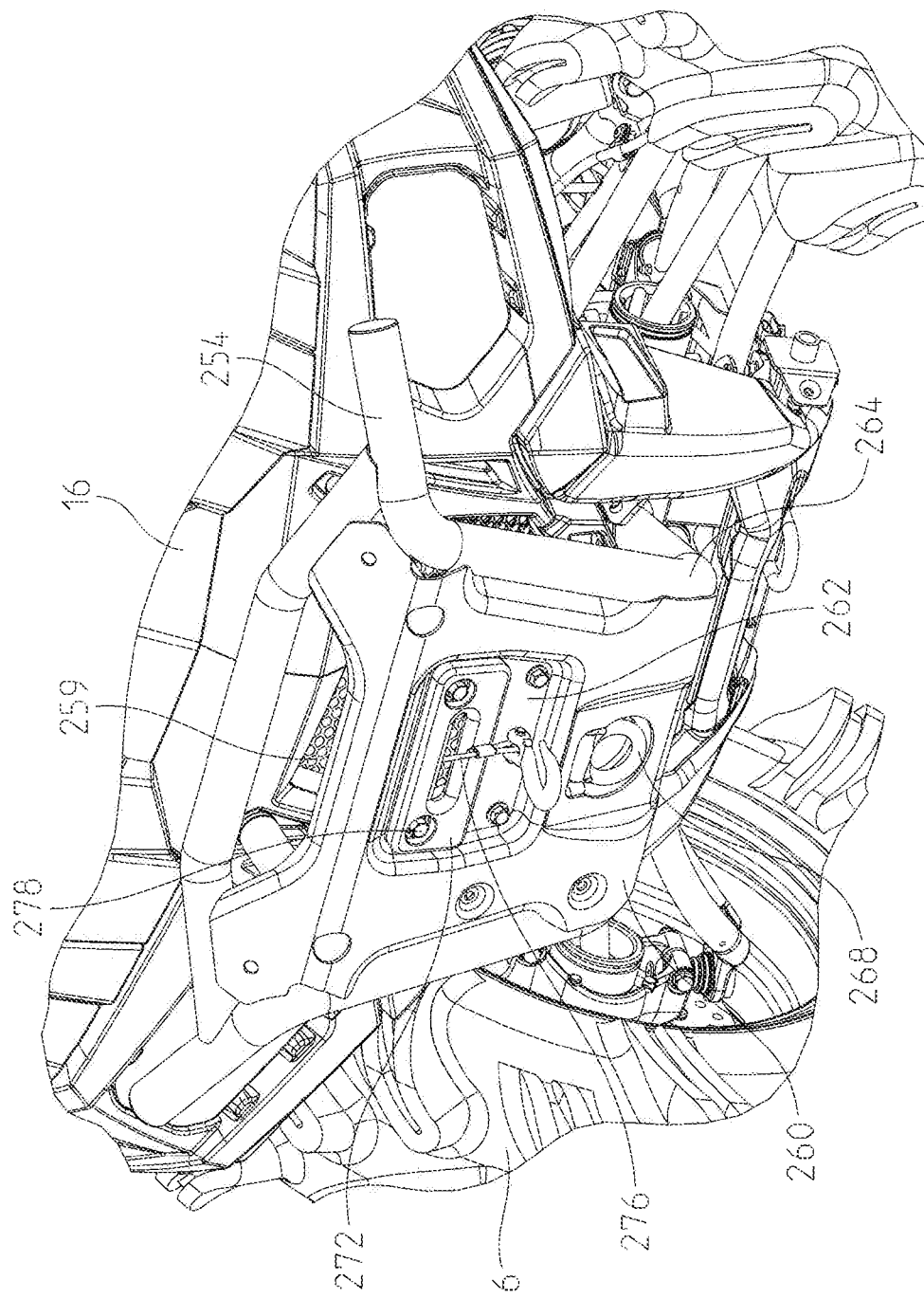
FIG. 34 is a left front perspective view of a front end of the vehicle of FIG. 1, including a front bumper and winch assembly.
Figure 35:
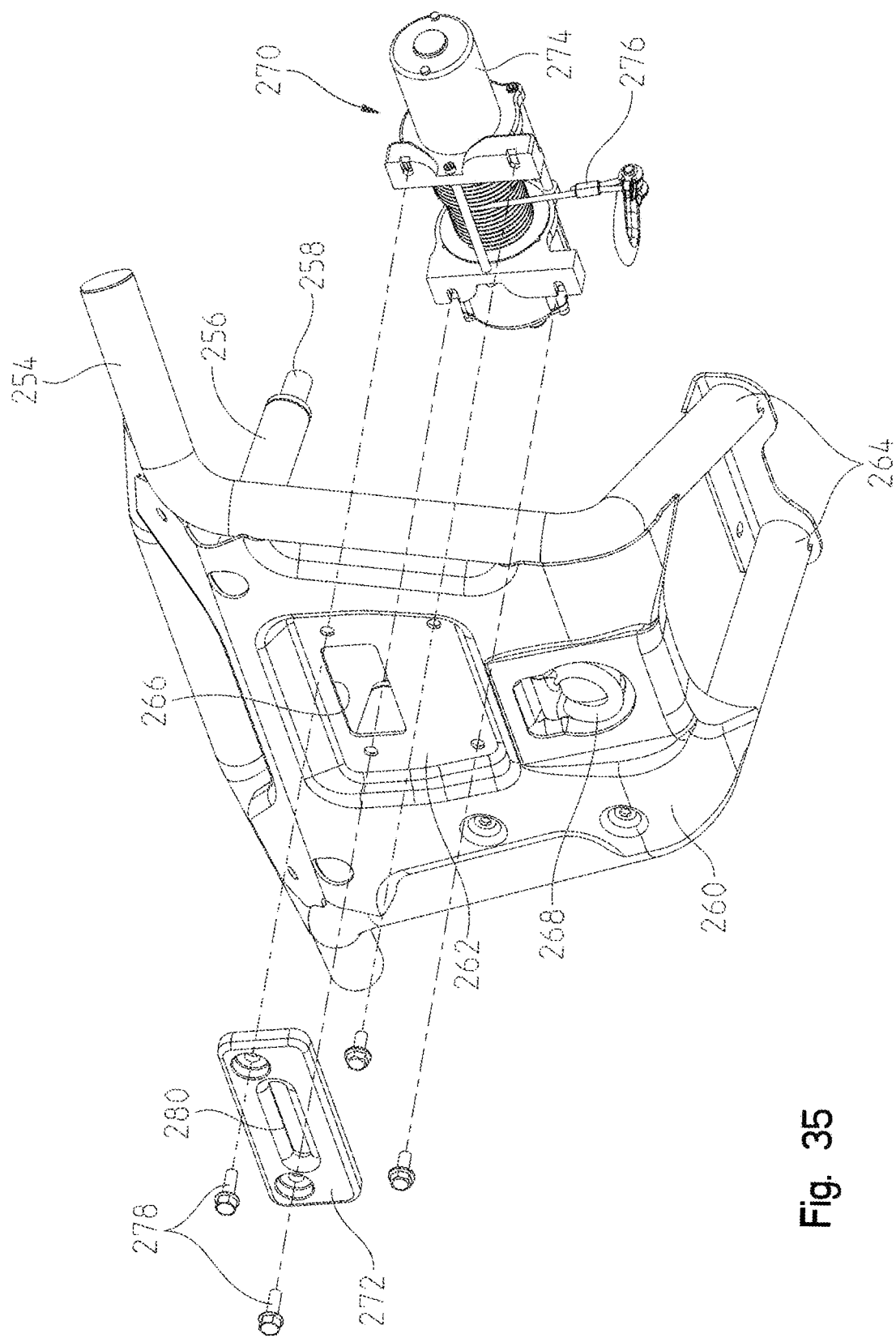
FIG. 35 is an exploded view of the winch assembly and front bumper of FIG. 34.

Referring to FIGS. 34 and 35, the front end of vehicle 2 includes a fender or bumper 254 and a winch assembly 270. Bumper 254 is coupled to frame assembly 10 and/or body panels 14 with rearwardly extending members 256 and couplers 258. Illustratively, bumper 254 is positioned forward of front grill 259 of vehicle 2 and is generally positioned below hood assembly 16. Bumper 254 includes frame members 264 and a main plate 260 positioned intermediate a portion of frame members 264. Additionally, a secondary plate 262 is integrally formed with or coupled to main plate 260 to support accessories on vehicle 2. Main plate 260 also supports a coupling member 268 configured for towing or load carrying applications. A similar bumper may provided at the rear end of vehicle 2.

Winch assembly 270 is an accessory which may be supported on vehicle 2 and includes a winch plate 272, a winch motor 274, and a winch cable 276. Winch plate 272 is directly coupled to secondary plate 262 of bumper 254 with couplers 278 rather than coupling with an extra mounting plate, body panels 14, and/or frame assembly 10. Winch plate 272 has an opening 280 which corresponds to an opening 266 in secondary plate 262 to receive winch cable 276. Winch motor 274 is supported on frame assembly 10 and/or body panels 14 and is positioned rearward of bumper 254 and forward of grill 259. In particular, winch assembly 270 is positioned along an upper portion of bumper 254 and grill 259, as is shown in FIG. 34, such that winch assembly 270 is further away from ground G and less affected by mud or water conditions. Winch motor 274 may be electrically or mechanically operated to release and retract winch cable 276. When winch cable 276 is released, winch cable 276 extends through openings 266, 280 to a position forward of vehicle 2 for towing or load carrying applications. In one embodiment, the load capacity of winch assembly 270 may be approximately 3,500 lbs.

Figure 37:
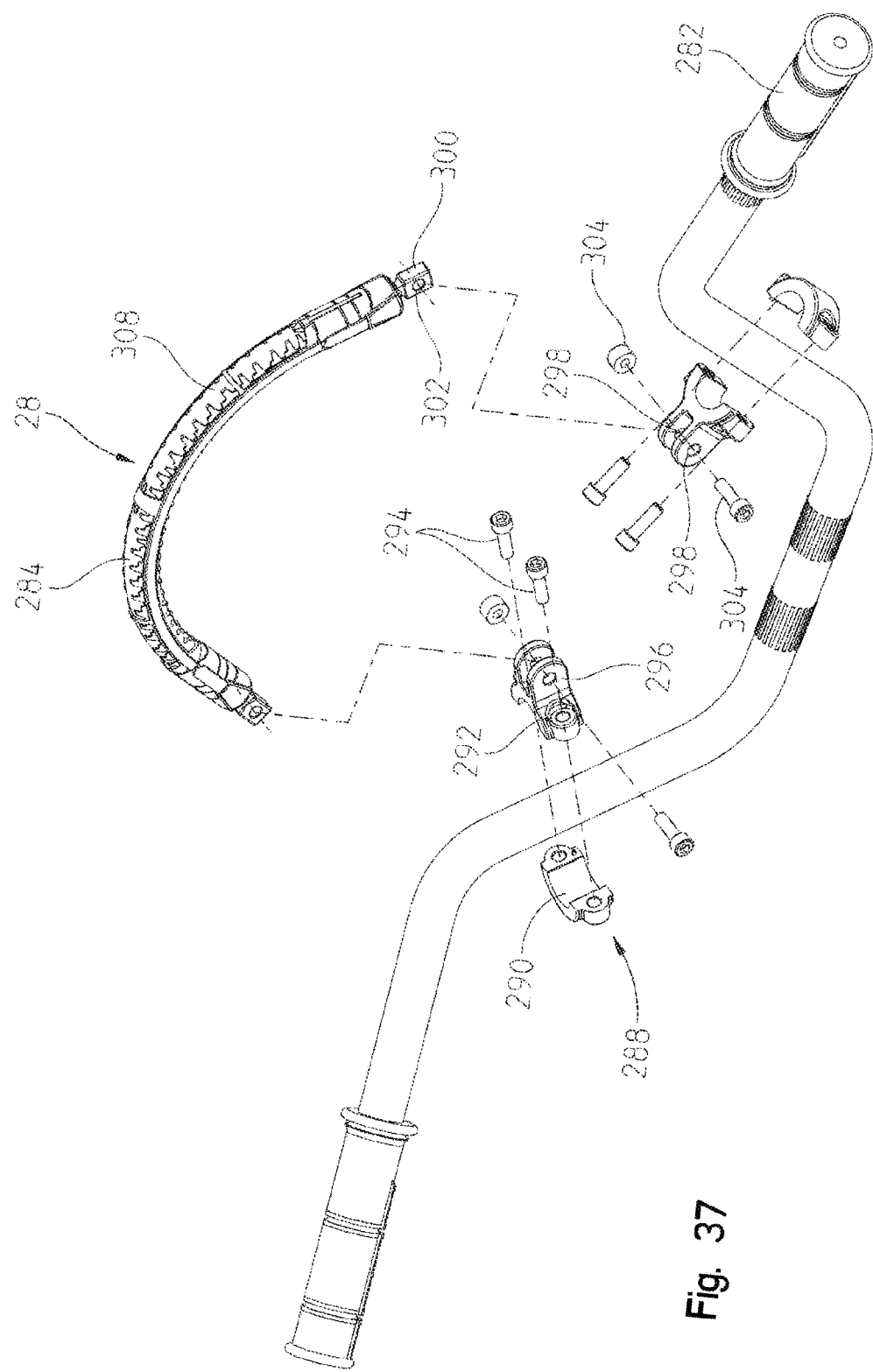
FIG. 37 is an exploded view of the handlebar assembly of FIG. 36.

Referring to FIGS. 36 and 37, steering assembly 28 of vehicle 2 is generally positioned forward of seat 12 (FIG. 1) for the operator to steer and operate vehicle 2. Steering assembly 28 includes handlebars 282, a steering hoop 284, and steering column 44. Handlebars 282 include a throttle control 286 and other electrical components for operating various components of vehicle 2.

Steering hoop 284 extends in an arcuate profile between handlebars 282 and is generally positioned above gauge 48. Steering hoop 284 is coupled to handlebars 282 with clamps 288, which include an outer clamp member 290 and an inner clamp member 292 coupled together with fasteners 294. Inner clamp member 292 includes at least one tab 296 with an aperture 298. Tab 296 is configured to receive a tab 300 of steering hoop 284 which includes an aperture 302 that aligns with aperture 298. When apertures 298, 302 are aligned, fasteners 304, 306 are provided for coupling steering hoop 284 to handlebars 282.

Steering hoop 284 may include an outer gripping surface 308 which allows the operator better control when gripping steering hoop 284. More particularly, the operator may at least partially stand while operating vehicle 2 and steering hoop 284 may provide a more ergonomical gripping surface for the operator's hands. For example, if vehicle 2 is operated in deep mud and/or water conditions, the operator may choose to at least partially stand and grip a portion of steering hoop 284 when operating vehicle 2.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An ATV, comprising:
   a plurality of ground engaging members;
   a frame supported above a ground surface by the plurality of ground engaging members and extending along a longitudinal centerline of the ATV;
   an operator seat supported by the frame;
   an engine supported by the frame;
   a CVT supported by the frame and operably coupled to the engine;

a CVT cooling air inlet fluidly coupled to the CVT and positioned forward of a forward end of the operator seat;
a CVT cooling air outlet fluidly coupled to the CVT and positioned forward of the forward end of the operator seat; and
an engine air inlet fluidly coupled to the engine and positioned forward of the operator seat and laterally aligned with at least one of the CVT cooling air inlet and the CVT cooling air outlet.

2. The ATV of claim 1, further comprising handlebars operably coupled to the ground engaging members for steering the ATV, and the CVT cooling air inlet and the CVT cooling air outlet are positioned forward of the handlebars.

3. The ATV of claim 1, wherein the CVT cooling air outlet is angled relative to the CVT cooling air inlet.

4. The ATV of claim 3, wherein the CVT cooling air inlet is configured to receive air in a direction parallel to the centerline.

5. The ATV of claim 4, further comprising a hood supported by the frame and the CVT cooling air inlet and the CVT cooling air outlet are positioned below a portion of the hood.

6. The ATV of claim 1, wherein the engine air inlet is laterally aligned with the CVT cooling air inlet and the CVT cooling air outlet.

7. The ATV of claim 6, wherein the engine air inlet is angled relative to the CVT cooling air inlet.

8. The ATV of claim 6, wherein the CVT cooling air inlet is laterally intermediate the engine air inlet and the CVT cooling air outlet.

9. The ATV of claim 8, further comprising a hood supported by the frame and including an upper hood member having a first separation member positioned intermediate the CVT and engine air inlets and a second separation member positioned intermediate the CVT cooling air inlet and the CVT cooling air outlet.

10. The ATV of claim 1, wherein the operator seat is a straddle seat.

11. The ATV of claim 1, wherein the CVT cooling air inlet and the CVT cooling air outlet are positioned above the operator seat.

12. The ATV of claim 11, further comprising a front fender supported by the frame and the CVT cooling air inlet and the CVT cooling air outlet are positioned above the front fender.

13. The ATV of claim 11, wherein the CVT cooling air inlet and the CVT cooling air outlet are positioned above the ground surface by a vertical distance of 44-52 inches.

14. An ATV, comprising:
a plurality of ground engaging members;
a frame supported by the plurality of ground engaging members and extending along a longitudinal centerline of the ATV;
an operator seat supported by the frame;
first and second footwells positioned below the operator seat;
an engine supported by the frame;
a CVT supported by the frame and operably coupled to the engine;
a CVT cooling air inlet fluidly coupled to the CVT and positioned forward of the operator seat and along the centerline;
a CVT cooling air outlet fluidly coupled to the CVT and positioned forward of the operator seat and laterally inward of the footwells; and
an engine air inlet fluidly coupled to the engine and positioned forward of the operator seat and laterally inward of the footwells.

15. The ATV of claim 14, further comprising a CVT cooling inlet conduit fluidly coupled to the CVT cooling air inlet and a CVT cooling outlet conduit fluidly coupled to the CVT cooling air outlet, a portion of the CVT cooling inlet conduit is positioned adjacent the first footwell, and a portion of the CVT cooling outlet conduit is positioned adjacent the first footwell.

16. The ATV of claim 14, further comprising a hood assembly supported by the frame and including a center portion and a rear cover portion, the rear cover portion having a first separation member positioned intermediate the CVT and engine air inlets and a second separation member positioned intermediate the CVT cooling air inlet and the CVT cooling air outlet.

17. The ATV of claim 16, wherein the center portion includes an opening and the CVT cooling air inlet, the CVT cooling air outlet, and the engine air inlet are received through the opening, and air is directed through the opening from below the ATV and toward the CVT cooling air inlet and the engine air inlet.

18. The ATV of claim 16, wherein the hood assembly further comprises a baffle coupled to the center portion and configured to direct air from below the ATV to the CVT cooling air inlet and the engine air inlet in an upward direction.

19. The ATV of claim 14, wherein the CVT cooling air inlet has an opening facing a forward end of the ATV, the CVT cooling air outlet has an opening angled toward a left side of the ATV, and the engine air inlet has an opening angled toward a right side of the ATV.

20. An ATV, comprising:
a plurality of ground engaging members;
a frame supported above a ground surface by the plurality of ground engaging members and extending along a longitudinal centerline of the ATV;
an operator seat supported by the frame;
an engine supported by the frame;
a CVT supported by the frame and operably coupled to the engine; and
a cooling assembly including a radiator and a plurality of fans fluidly coupled to the radiator, a forward end of the radiator is positioned rearward of a forward end of the ATV, and the plurality of fans are angled laterally away from the longitudinal centerline.

21. The ATV of claim 20, further comprising a hood assembly and an upper surface of the radiator is positioned below the hood assembly.

22. The ATV of claim 21, wherein the hood assembly includes an air outlet fluidly coupled to the radiator, and an opening of the air outlet is angled relative to the centerline.

23. The ATV of claim 21, wherein the radiator includes a perimeter and the perimeter of the radiator is sealingly coupled to the hood assembly.

24. The ATV of claim 20, wherein the fans are configured to draw air through the radiator from below the ATV.

25. The ATV of claim 20, wherein each of the fans is angled 5°-25° laterally outward from the longitudinal centerline.

26. An ATV, comprising:
a plurality of ground engaging members;
a frame supported above a ground surface by the plurality of ground engaging members and extending along a longitudinal centerline of the ATV;
an operator seat supported by the frame;

an engine supported by the frame;
a CVT supported by the frame and operably coupled to the engine; and
a cooling assembly including a radiator and at least one fan positioned above the radiator, and a forward end of the radiator is positioned rearward of a forward end of the ATV, and the at least one fan is configured to draw air through the radiator from below the ATV.

27. The ATV of claim 26, wherein the at least one fan includes a first fan and a second fan, and the first and second fans are positioned above the radiator.

28. The ATV of claim 26, further comprising a hood assembly and an upper surface of the radiator and an upper surface of the at least one fan are positioned below the hood assembly.

29. The ATV of claim 28, wherein the hood assembly includes an upper hood member and a lower hood member, the lower hood member includes at least one opening for receiving the at least one fan and the upper hood member is positioned above the at least one fan.

30. The ATV of claim 29, further comprising a CVT cooling air intake, a CVT cooling air outlet, and an engine air intake supported by the hood assembly adjacent the opening for receiving the at least one fan.

31. The ATV of claim 26, wherein the at least one fan is angled 5°-25° laterally outward from the longitudinal centerline.

32. The ATV of claim 26, wherein the at least one fan is positioned vertically above an upper surface of the radiator.

33. The ATV of claim 32, wherein the radiator has a lower surface and air is configured to flow into the radiator through the lower surface and flow from the radiator through the upper surface.

34. The ATV of claim 26, further comprising a suspension assembly including a curved control arm and the curved control arm is positioned vertically below the radiator.

35. The ATV of claim 1, wherein the operator seat defines a straddle seat.

36. The ATV of claim 14, wherein the operator seat defines a straddle seat.

37. The ATV of claim 20, wherein the operator seat defines a straddle seat.

38. The ATV of claim 26, wherein the operator seat defines a straddle seat.

* * * * *

UNITED STATES PATENT AND TRADEMARK OFFICE
CERTIFICATE OF CORRECTION

PATENT NO. : 9,649,928 B2
APPLICATION NO. : 14/751114
DATED : May 16, 2017
INVENTOR(S) : Danielson et al.

Page 1 of 1

It is certified that error appears in the above-identified patent and that said Letters Patent is hereby corrected as shown below:

On the Title Page

Item (72), should read:
(72) Inventors: Ronnie R. Danielson, Roseau, MN (US);
Amanda S. Peterson, Forest Lake, MN (US);
Kendall C. Majer, Roseau, MN (US);
Burton D. Fischer, Badger, MN (US);
Ryan L. Haugen, Roseau, MN (US);
Todd M. Blumer, Badger, MN (US);
William B. Rodriguez, Roseau, MN (US);
Steven D. Wilcox, Maple, Grove, MN (US);
Jeremy R. Eichenberger, Warroad, MN (US)

Signed and Sealed this
Sixth Day of September, 2022

Katherine Kelly Vidal
*Director of the United States Patent and Trademark Office*